United States Patent
Watanabe et al.

(10) Patent No.: US 7,304,667 B2
(45) Date of Patent: Dec. 4, 2007

(54) IMAGE CAPTURING APPARATUS THAT OUTPUTS CONDITION DATA IN ASSOCIATION WITH AN IMAGE

(75) Inventors: Mikio Watanabe, Saitama (JP); Koichi Sakamoto, Saitama (JP); Hisayoshi Tsubaki, Saitama (JP); Yoshihiro Yamaguchi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 1246 days.

(21) Appl. No.: 10/197,610

(22) Filed: Jul. 18, 2002

(65) Prior Publication Data
US 2003/0048362 A1    Mar. 13, 2003

(30) Foreign Application Priority Data
Sep. 12, 2001 (JP) ............................ 2001-276708
Mar. 11, 2002 (JP) ............................ 2002-065988
Apr. 9, 2002 (JP) ............................ 2002-106372

(51) Int. Cl.
*H04N 5/235* (2006.01)
(52) U.S. Cl. ................................................. 348/221.1
(58) Field of Classification Search ............. 348/221.1, 348/231.3, 345
See application file for complete search history.

(56) References Cited

U.S. PATENT DOCUMENTS

| | | | |
|---|---|---|---|
| 4,574,319 A | 3/1986 | Konishi | |
| 5,111,299 A | 5/1992 | Aoki et al. | |
| 5,479,237 A * | 12/1995 | Kitaoka | 396/299 |
| 6,273,535 B1 | 8/2001 | Inoue et al. | |
| 6,650,437 B1 | 11/2003 | Nakajima | |
| 7,053,937 B1 * | 5/2006 | Aoki | 348/231.3 |
| 7,170,552 B2 * | 1/2007 | Parulski et al. | 348/207.2 |
| 2001/0033303 A1 * | 10/2001 | Anderson | 345/854 |
| 2006/0227217 A1 * | 10/2006 | Satoh et al. | 348/207.99 |

FOREIGN PATENT DOCUMENTS

EP    0 584 690 A1    3/1994

OTHER PUBLICATIONS

FlashPix Format Specification Version 1.0, Sep. 11, 1996, Eastman Kodak Company.*

* cited by examiner

*Primary Examiner*—Lin Ye
*Assistant Examiner*—James M. Hannett
(74) *Attorney, Agent, or Firm*—Sughrue Mion, PLLC

(57) ABSTRACT

An image processing system includes: an image capturing apparatus for obtaining an image of a subject, having a setting unit, which sets an obtaining condition for the image according to user's operation, and an outputting unit, which outputs the obtaining condition in association with the image; and an image processing apparatus for performing an image processing for the image, having a receiving unit, which receives the image and the obtaining condition, an image processing unit, which performs an image processing for the image, and a controlling unit, which controls the image processing unit based on the obtaining conditions.

16 Claims, 13 Drawing Sheets

| PROCESS DEGREE DESIGNATING CODE | COLOR DEPTH ADJUSTING PROCESS | COLOR BALANCE ADJUSTING PROCESS | EDGE ENHANCING PROCESS | PRINTER GAMMA |
|---|---|---|---|---|
| A | +2 | R: +3, G: +2, B: −3 | +5 | 1.3 |
| B | −3 | R: ±0, G: ±0, B: +5 | −2 | 1.6 |
| C | ±0 | ±0 | ±0 | 1.0 |

FIG. 12

IMAGE CAPTURING APPARATUS THAT OUTPUTS CONDITION DATA IN ASSOCIATION WITH AN IMAGE

This patent application claims priority based on Japanese patent applications, 2001-276708 filed on Sep. 12, 2001, 2002-65988 filed on Mar. 11, 2002, and 2002-106372 filed on Apr. 9, 2002, the contents of which are incorporated herein by reference.

BACKGROUND OF THE INVENTION

1. Field of the Invention

The present invention relates to an image processing system, an image capturing apparatus, an image processing apparatus, image processing method, and computer-readable medium storing program for image processing. More particularly, the present invention relates to an image capturing apparatus outputting an image in conjunction with an obtaining condition, under which the image is obtained, so as to change contents of the image processing by an external image processing apparatus; and an image processing apparatus performing an image processing based on the obtaining condition.

2. Description of the Related Art

Conventionally, a digital camera has functions such as AWB (Auto White Balance), AE (Auto Exposure), AF (Auto Focus), so as to set capturing configurations automatically to obtain an image. Also, the digital camera can obtain an image with manual capturing configurations, which are set by the user's manual operation in advance of capturing. Moreover, an image processing apparatus such as a printer, which carries out automatic image processing to an image obtained by the digital camera and outputs the image, is used.

However, even though the user sets manual capturing configurations of the digital camera to his taste and captures an image of a subject, there is a possibility that the image processing apparatus, such as the printer, carries out unwished image processing automatically and outputs the image.

SUMMARY OF THE INVENTION

Therefore, it is an object of the present invention to provide an image processing system, an image capturing apparatus, an image processing apparatus, an image processing method, and a computer-readable medium storing program, which overcomes the above issues in the related art. This object is achieved by combinations described in the independent claims. The dependent claims define further advantageous and exemplary combinations of the present invention.

According to the first aspect of the present invention, an image processing system comprises an image capturing apparatus, which obtains an image of a subject, comprising a setting unit, which sets an obtaining condition for the image in accordance with user's operation, and an outputting unit, which is connected to the setting unit and outputs the obtaining condition in association with the image; and an image processing apparatus, which is operatively associated with the image capturing apparatus and receives the image and the obtaining condition from the image capturing apparatus, comprising an image processing unit, which performs an image processing for the image, and a controlling unit, which is connected to the image processing unit and controls the image processing unit based on the obtaining condition associated with the image.

The setting unit may set a manual capturing configuration as the obtaining condition for the image, and the outputting unit may output the manual capturing configuration in association with the image, and the controlling unit may change contents of the image processing by the image processing unit based on the manual capturing configuration.

The capturing apparatus may further comprise a capturing configurations judging unit, which determines auto capturing configuration as the capturing configuration for the image, and the outputting unit may further output the auto capturing configuration in association with the image, and the controlling unit may change contents of the image processing by the image processing unit based on the manual capturing configuration and the auto capturing configuration.

According to the second aspect of the present invention, an image processing system comprises an image capturing apparatus, which obtains an image of a subject, comprising a setting unit, which inputs image processing control information for designating a parameter of an image processing for the image in accordance with user's operation, and an outputting unit, which is connected to the setting unit and outputs the image processing control information in association with the image; and an image processing apparatus, which is operatively associated with the capturing apparatus and receives the image and the image processing control information from the capturing apparatus, comprising an image processing unit, which performs image processing for the image; and a controlling unit, which is connected to the image processing unit and controls the image processing unit based on the image processing control information associated with the image.

According to the third aspect of the present invention, an image capturing apparatus for capturing an image of a subject, comprises a setting unit, which sets an obtaining condition for the image in accordance with user's operation, and an outputting unit, which outputs the obtaining condition in association with the image.

The setting unit may set a manual capturing configuration as the obtaining condition for the image, and the outputting unit may output the manual capturing configuration in association with the image.

The setting unit may set exposure as the manual capturing configuration for the image, and the outputting unit may output exposure information, which represents the exposure, in association with the image.

The setting unit may set color balance of the image as the manual capturing configuration, and the outputting unit may output color balance information, which represents the color balance, in association with the image.

The setting unit may set focus for the image as the manual capturing configuration, and the outputting unit may output focus information, which represents the focus, in association with the image.

The setting unit may set capture mode for the image as the manual capturing configuration, and the outputting unit may output capture mode information, which represents the capture mode, in association with the image.

The setting unit may set aperture-priority auto exposure, in which exposure is determined giving priority to aperture, as the manual capturing configuration, and the outputting unit may output aperture-priority auto exposure information, which shows that the aperture-priority auto exposure is set, in association with the image.

The image capturing apparatus may further comprise a capturing configurations judging unit, which is connected to the outputting unit and determines auto capturing configuration as the capturing configuration for the image, wherein the outputting unit may further output the auto capturing configuration in association with the image.

The outputting unit may output manual focus value, which represents focus set by the setting unit as the manual capturing configuration, and auto focus value, which represents focus determined by the capturing configurations judging unit as the auto capturing configuration, in association with the image.

The outputting unit may output manual color balance value, which represents color balance set by the setting unit as the manual capturing configuration, and auto color balance value, which represents color balance determined by the capturing configurations judging unit as the auto capturing configuration, in association with the image.

The outputting unit may output manual aperture value, which represents aperture value set by the setting unit as the manual capturing configuration, and auto aperture value, which represents aperture value determined by the capturing configurations judging unit as the auto capturing configuration, in association with the image.

The image capturing apparatus may further comprise a tag information processing unit, which is connected to the setting unit and the capturing configuration judging unit, and generates image processing control information for changing a parameter of an image processing for the image, based on the difference between the manual capturing configuration and the auto capturing configuration, wherein the outputting unit may output the image processing control information in association with the image.

The tag information processing unit may generate information for limiting degree of the image processing, as the image processing control information, in a case the difference between the manual capturing configuration and the auto capturing configuration is bigger than a predetermined value, and reduce an amount of information regarding the image processing to be limited.

The image capturing apparatus may further comprise a tag information processing unit, which is connected to the setting unit, the capturing configurations judging unit, and the outputting unit, and adjusts an amount of the information that the outputting unit outputs in association with the image, based on the difference between the manual capturing configuration and the auto capturing configuration.

The tag information processing unit may reduce the amount of the information regarding the auto capturing configuration among the information that the outputting unit outputs in association with the image, in a case where the difference between the manual capturing configuration and the auto capturing configuration is less than a predetermined value.

According to the forth aspect of the present invention, an image capturing apparatus for capturing an image of a subject, comprises a setting unit, which inputs image processing control information for designating a parameter of an image processing for the image; and an outputting unit, which outputs the image processing control information in association with the image.

The image processing control information may be user information, which identifies a user of the apparatus.

According to the fifth aspect of the present invention, an image processing apparatus, which receives an image and an obtaining condition for the image, comprises an image processing unit, which performs an image processing for the image, and a controlling unit, which controls the image processing unit based on the obtaining condition associated with the image.

The image processing unit may perform a plurality of different kinds of image processing for the image, and the controlling unit may prohibit at least one kind of the image processing among the plurality of different kinds of the image processing based on the obtaining condition.

The image processing apparatus, may further receive a manual capturing configuration as the obtaining condition for the image, wherein the controlling unit may change contents of the image processing by the image processing unit based on the manual capturing configuration.

The image processing apparatus may further receive exposure information, which represents exposure for the image, as the manual capturing configuration, wherein the controlling unit may change degree of a color depth adjusting process by the image processing unit based on the exposure information.

The image processing apparatus may further receive color balance information, which represents color balance of the image, as the manual capturing configuration, wherein the controlling unit may change degree of a color balance adjusting process by the image processing unit based on the color balance information.

The image processing apparatus may further receive focus information, which represents focus for the image, as the manual capturing configuration, wherein the controlling unit may change degree of a edge enhancing process by the image processing unit based on the focus information.

The image processing apparatus may further receive capture mode information, which represents a capture mode for the image, as the manual capturing configuration, wherein the controlling unit may change degree of the image processing by the image processing unit based on the capture mode information.

The image processing apparatus may further receive an auto capturing configuration, which represents a capturing configuration determined by the capturing apparatus, wherein the controlling unit may change contents of the image processing by the image processing unit based on the manual capturing configuration and the auto capturing configuration.

The image processing apparatus may further receive manual focus, as the manual capturing configuration, which represents focus that is set in accordance with user's operation, and auto focus, as the auto capturing configuration, which represents focus that is determined by the capturing apparatus, wherein the controlling unit may decrease degree of edge enhancing process by the image processing unit, according to an amount of difference between the manual focus and the auto focus.

The image processing apparatus may further receive a manual depth of field, as the manual capturing configuration, which represents a depth of field that is set in accordance with user's operation, and an auto depth of field, as the auto capturing configuration, which represents a depth of field that is determined by the capturing apparatus, wherein the controlling unit may decrease degree of edge enhancing process by the image processing unit, according to an amount of difference between the manual depth of field and the auto depth of field.

The image processing apparatus may further receive a manual aperture value, as the manual capturing configuration, which represents a aperture value that is set in accordance with user's operation, and an auto aperture value, as the auto capturing configuration, which represents an aperture value that is determined by the capturing apparatus, wherein the controlling unit may decrease degree of edge enhancing process by the image processing unit, according to an amount of difference between the manual aperture value and the auto aperture value.

The image processing apparatus may further receive aperture-priority auto exposure information, as the manual capturing configuration, which shows that aperture-priority auto exposure is set for the image in the capturing apparatus, wherein the controlling unit may decrease degree of edge enhancing process by the image processing unit according to an amount of difference between the manual aperture value and the auto aperture value, in a case where the processing apparatus received the aperture-priority auto exposure information.

The controlling unit may change contents of the image processing by the image processing unit based on difference between the manual capturing configuration and the auto capturing configuration.

The controlling unit may change the contents of the image processing by the image processing unit based on the image in a case where the difference between the manual capturing configuration and the auto capturing configuration is less than a predetermined value.

The controlling unit may set contents of the image processing to those preset in the image processing apparatus, in a case the difference between the manual capturing configuration and the auto capturing configuration is more than a predetermined value.

The image processing apparatus may further comprise a printing unit, which prints the image processed by the image processing unit.

According to the sixth aspect of the present invention, an image processing apparatus, which receives an image and image processing control information for designating a parameter of an image processing for the image, comprises an image processing unit, which performs an image processing for the image; and a controlling unit, which controls the image processing unit based on the image processing control information associated with the image.

According to the seventh aspect of the present invention, an image processing method for performing an image processing for an image comprises steps of receiving the image and an obtaining condition for the image, which is set in accordance with user's operation of a image capturing apparatus for the image; and controlling an image processing unit, which performs the image processing for the image, based on the obtaining condition associated with the image.

According to the eighth aspect of the present invention, an image processing method for performing an image processing for an image comprises steps of receiving the image and image processing control information, which is set in accordance with user's operation of an image capturing apparatus and designates a parameter of the image processing; and changing a parameter of the image processing for the image based on the image processing control information associated with the image.

According to the ninth aspect of the present invention, a computer-readable medium stores a program for obtaining an image of a subject, and the program comprises a setting module, which operates a computer to set obtaining condition for the image in accordance with user's operation, and an outputting module, which operates the computer to output the obtaining condition in association with the image.

According to the tenth aspect of the present invention, a computer-readable medium stores a program for performing an image processing for an image, and the program comprises a receiving module, which operates a computer to receive the image and an obtaining condition for the image, which is set in accordance with user's operation, an image processing module, which operates the computer to perform the image processing for the image, and a controlling module, which operates the computer to control the image processing based on the image obtaining condition associated with the image.

According to the eleventh aspect of the present invention, a computer-readable medium stores a program for performing an image processing for an image, and the program comprises a receiving module, which operates a computer to receive the image and image processing control information, which is set in accordance with user's operation of an image capturing apparatus and designates a parameter of the image processing; and a controlling module, which operates the computer to control the image processing for the image based on the image processing control information associated with the image.

According to the twelfth aspect of the present invention, an image processing system comprises an image capturing apparatus, which sets an obtaining condition for an image according to user's operation and captures the image and outputs the obtaining condition in association with the image; and an image processing apparatus, which is operatively associated with the capturing apparatus and receives the image and the obtaining condition from the capturing apparatus and performs an image processing for the image based on the obtaining condition associated with the image.

This summary of the invention does not necessarily describe all necessary features of the present invention. The present invention may also be a sub-combination of the above described features. The above and other features and advantages of the present invention will become more apparent from the following description of embodiments taken in association with the accompanying drawings.

BRIEF DESCRIPTION OF THE DRAWINGS

FIG. 12 is an example of a process degree-designating table according to an embodiment of the invention.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention.

Figure 1:
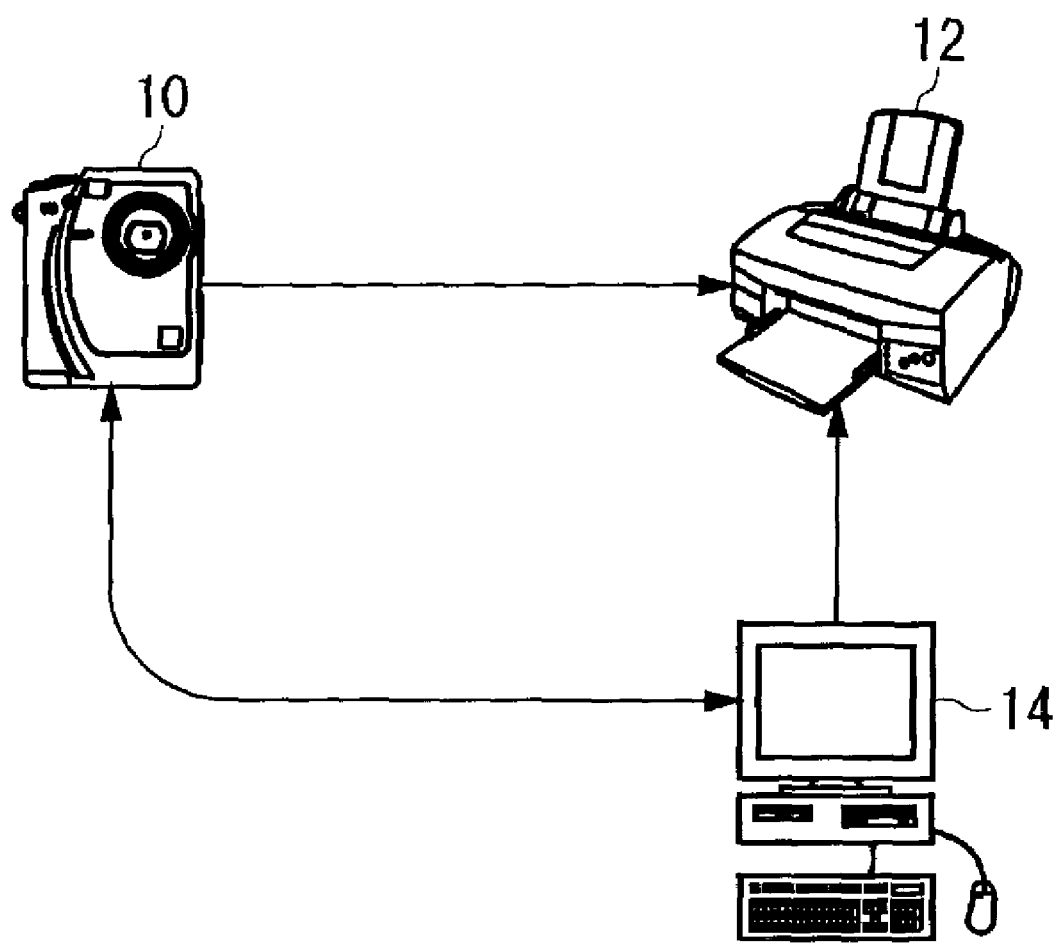
FIG. 1 shows an image processing system according to an embodiment of the invention.

FIG. 1 is an image processing system of the first embodiment of the present invention. The image processing system comprises a digital camera 10, a printer 12, and a personal computer 14. The digital camera 10, the printer 12, and the personal computer 14 communicates datum to each other over a data transmission line. The data transmission line includes IEEE1394, USB, and the like as wired interfaces, and IrDA, Bluetooth, wireless LAN, and the like as wireless interfaces. The data transmission line may be a network having a plural number of wired interfaces and wireless interfaces, like the Internet network. Also, digital camera 10, printer 12, and personal computer 14 may use a removable medium as a recording medium to exchange data with each other.

The digital camera 10 obtains an image of a subject, and sends the obtained image data to the printer 12 or the personal computer 14. The printer 12, or personal computer 14 outputs the image data after performing specific process for the image data. Specifically, the printer 12 outputs the image data by printing the image, and personal computer 14 outputs the image data by displaying the image on a monitor. Also, personal computer 14 changes configurations of the digital camera 10 or the printer 12 by sending configuration data to them.

Moreover, the digital camera 10 in the present application is an example of an image capturing apparatus or an image processing apparatus. Also, printer 12 and personal computer 14 are examples of image processing apparatus. The image capturing apparatus may be a digital still camera, which captures a still image of an object, or a digital video recorder, which records a moving image. And the image processing apparatus may be a printing apparatus for a processing laboratory, which prints the image captured by a digital camera after automatically adjusting the image. Besides, the image processing apparatus may have a display device, such as CRT and LCD, and may perform image processing for the image data that the display device outputs. Moreover, the digital camera 10 may have the functions of the printer 12.

Figure 2:
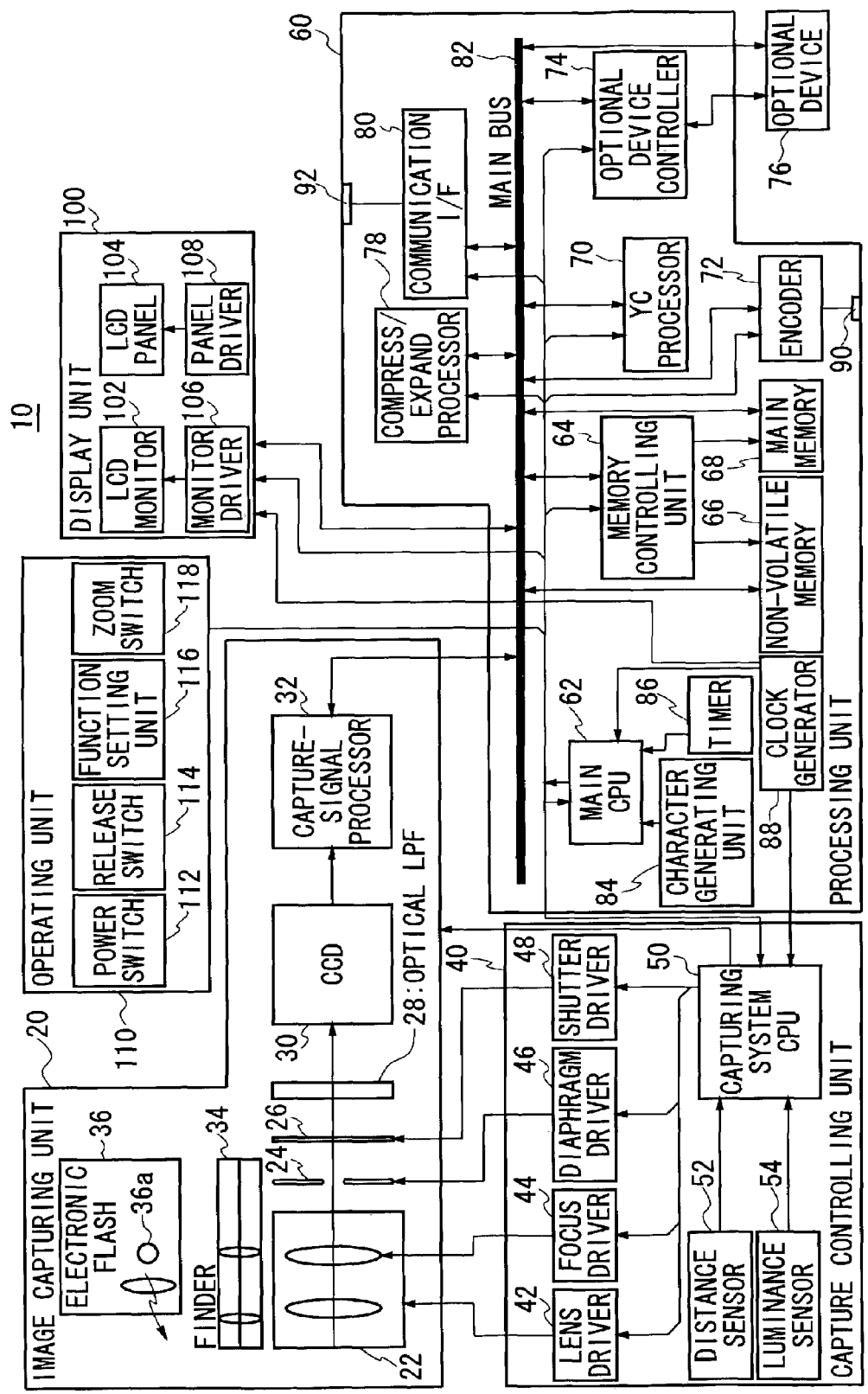
FIG. 2 is a block diagram of a digital camera 10.

FIG. 2 is a block diagram of the digital camera 10. The digital camera 10 mainly includes an image-capturing unit 20, a capture controlling unit 40, a processing unit 60, a display unit 100 and an operating unit 110.

The image-capturing unit 20 includes mechanical members and electric members related to image capturing and image formation. The image-capturing unit 20 includes a lens section 22, a diaphragm 24, a shutter 26, an optical LPF (low-pass filter) 28, a CCD 30 as an example of a solid-state image sensor, and a capture-signal processor 32. The lens section 22 includes a focus lens, a zoom lens and the like. This structure allows an image of a subject to be focused on a light-receiving surface of the CCD 30. In accordance with the light amount of the focused image of the subject, respective sensor elements (not shown) of the CCD 30 are electrically charged (hereinafter, the electric charges stored in the sensor element are referred to as "stored electric charges"). The stored electric charges are read by a read-gate pulse into a shift register (not shown), and are then successively read out as a voltage signal by a register transfer pulse.

The digital camera 10 generally has an electronic shutter function. Therefore, it is not necessary for the digital camera 10 to include a mechanical shutter such as the shutter 26. In order to realize the electronic shutter function, the CCD 30 is provided with a shutter drain via a shutter gate. When the shutter gate is driven, the stored electric charges are drained out to the shutter drain. By controlling the shutter gate, a time period during which the respective sensor elements are electrically charged, that is, a shutter speed can be controlled.

The voltage signal output from the CCD 30, that is an analog signal, is subjected to color separation for separating the signal into R, G and B components in the capture-signal processor 32, thereby white balance is adjusted. Next, the capture-signal processor 32 performs gamma correction. Then, the R, G and B signals are successively subjected to A/D conversion at necessary times. Digital image data obtained by the above operations (hereinafter, simply referred to as "digital image data") is output to the processing unit 60.

The image-capturing unit 20 further includes a finder 34 and an electronic flash 36. The finder 34 may includes an LCD (not shown) therein. In this case, various types of information from a main CPU 62 and the like can be displayed within the finder 34. The electronic flash 36 works by emission of light by a discharge tube 36a when energy stored in a condenser (not shown) is supplied to the discharge tube 36a.

The capture controlling unit 40 includes a lens driver 42, a focus driver 44, a diaphragm driver 46, a shutter driver 48, a capturing system CPU 50 for controlling these drivers, a distance sensor 52 and a luminance sensor 54. Each of the drivers 42, 44, 46 and 48 has a driving means such as a stepping motor. When a release switch 114 described later is pressed down, the distance sensor 52 measures a distance to the subject while the luminance sensor 54 measures a luminance of the subject. The measured data of the distance (hereinafter, simply referred to as "distance data") and the measured data of the luminance (hereinafter, simply referred to as "luminance data") are sent to the capturing system CPU 50. The capturing system CPU 50 performs adjustments of a magnifying power and a focus of the lens section 22 by controlling the lens driver 42 and the focus driver 44 based on capturing information such as magnification or capture modes specified by the user.

The capture mode in the present embodiment is a plurality of combinations of capturing configurations (combinations of magnification, shutter speed, F-number, ON/OFF of the electronic flash) that are preset in the digital camera 10. For example, the capture mode includes a normal mode, a portrait mode, a landscape mode, a night scene mode, and the like. When the user selects capture mode, digital camera 10 sets magnification, shutter speed, aperture size, ON/OFF of the electronic flash, and the like corresponding to the capture mode selected.

The capturing system CPU 50 determines the F-number and the shutter speed based on an added value of the R, G and B digital signals of one image frame, that is, AE information, and then determines a time at which the shutter is to be driven. In accordance with the determination results, the diaphragm driver 46 adjusts the aperture size of the diaphragm and the shutter driver 48 performs opening/closing of the shutter 26.

Moreover, the capturing system CPU 50 controls the light emission by the electronic flash 36 based on the luminance data and also adjusts the aperture size of the diaphragm 24. When the user instructs the digital camera 10 to capture an image, the CCD 30 starts to be electrically charged. After the shutter time period calculated from the luminance data has passed, the stored electric charges are output to the capture-signal processor 32.

The processing unit 60 includes a main CPU 62 for controlling the entire digital camera 10, especially the processing unit 60, a memory controlling unit 64, a YC processor 70, an optional device controller 74, a compress/expand processor 78, and a communication interface (I/F) 80 all of which are controlled by the main CPU 62. The main CPU 62 communicates with the capturing system CPU 50 by serial communication or the like. An operation clock of the main CPU 62 is supplied from a clock generator 88 that also supplies clocks having different frequencies to the capturing system CPU 50 and the display unit 100, respectively.

In addition to the main CPU 62, a character generating unit 84 and a timer 86 are provided in the processing unit 60. The timer 86 has the backing of a battery cell so that the timer 86 always counts the time and date. Based on the counted values, information regarding the capturing date and other information related to the time are sent to the main CPU 62. The character generating unit 84 generates character information such as the capturing date, a title of the captured image or the like. The thus generated character information is appropriately combined with the captured image.

The memory-controlling unit 64 controls a non-volatile memory 66 and a main memory 68. The non-volatile memory 66 includes an EEPROM (electrically erasable and programmable ROM) and/or a flash memory or the like, and stores various data to be held even when the power of the digital camera 10 turns off, such as information set by the user, parameters set when the digital camera 10 is shipped, or the like. The non-volatile memory 66 can store a boot program for the main CPU 62 or a system program, if necessary. On the other hand, the main memory 68 is generally composed of a relatively inexpensive memory having a larger capacity, such as a DRAM. The main memory 68 has a function of a frame memory for storing data output from the image capturing unit 20, a function of a system memory for loading necessary programs, and a function of a working area. The non-volatile memory 66 and the main memory 68 communicate with the parts in the processing unit 60 and other parts outside the processing unit 60 via a main bus 82.

The YC processor 70 subjects the digital image data to YC conversion so as to generate a luminance signal Y and color-difference signals B-Y and R-Y. The luminance signal and the color difference signals are temporarily stored in the main memory 68 by the memory-controlling unit 64. The compress/expand processor 78 successively reads the luminance signal and the color-difference signals from the main memory 68 and compresses the read signals. The resultant data (hereinafter, simply referred to as "compressed data") is written into a memory card, that is a kind of optional device 76, via the optional device controller 74.

The processing unit 60 further includes an encoder 72. The encoder 72 inputs the luminance signal and the color-difference signals, converts these input signals into a video signal (NTSC or PAL signal) and then outputs the video signal from a video output terminal 90. In a case where the video signal is generated from the data stored in the optional device 76, the data is first supplied to the compress/expand processor 78 via the optional device controller 74, and is then subjected to a necessary expansion operation in the compress/expand processor 78. Finally, the expanded data is converted into the video signal by the encoder 72.

The optional device controller 74 performs generation of a signal or signals required by the voltage conversion in accordance with the specification of signals accepted by the optional device 76 and the bus-specification of the main bus 82. The digital camera 10 may support a device other than the aforementioned memory card, for example, a standard I/O card conforming to PCMCIA. In this case, the optional device controller 74 may be composed of an LSI main bus 82 and the optional device 76, logical transform, or for controlling a bus for PCMCIA.

The communication I/F 80 controls protocol conversion according to the communication specification supported by the digital camera 10, such as USB, RS-232C, Ethernet, Bluetooth, IrDA or the like. The communication I/F 80 includes a driver IC, if necessary, and communicates with an external device including a network via a connector 92. In addition, the digital camera 10 may be configured to allow data communication with an external device such as a printer, a sing-along machine (karaoke), or a game player, by means of a special I/F, other than the above-mentioned standard specification.

The display unit 100 includes an LCD monitor 102 and an LCD panel 104 that are respectively controlled by a monitor driver 106 and a panel driver 108. The LCD monitor 102, which is about a 2-inch LCD panel, for example, is provided on the back face of the digital camera 10 and displays a current mode such as a capturing mode or a playback mode, magnification of the image capturing or the playback image, the residual amount of the battery cell, the date and time, a screen for setting modes, an image of the subject, or the like. The LCD panel 104 is a small monochrome LCD, for example, and is provided on the upper face of the digital camera 10. The LCD panel 104 simply displays information such as the image quality ("FINE", "NORMAL", or "BASIC", for example), ON/OFF of the electronic flash, the number of images normally capturable, the number of pixels, and the battery capacity or the like.

The operating unit 110 includes mechanisms and electric members required for the user to set or instruct the operation and the mode of the digital camera 10 to the digital camera 10. A power switch 112 determines on/off of the power of the digital camera 10. The release switch 114 has a two-step structure allowing half-pressing and complete-pressing of it. For example, when the release switch 114 is half-pressed, AF and AE are locked. Then, the release switch 114 is completely pressed, a shot image is taken into the digital camera 10 and is recorded in the main memory 68 and/or the optional device 76 after necessary signal processing and data compression are performed. The operating unit 110 may receive the setting by the user via other means than the aforementioned switches, such as a rotary mode dial or a cross key. The other means that can be used is generally shown as a function setting unit 116 in FIG. 2. The operations or functions that can be set by the operating unit 110 include "file format", "special effect", "print", "determine/save", and "change display", for example. The zoom switch 118 determines the magnifying power.

The digital camera 10 having the above-mentioned structure operates in the following manner. First, the power switch 112 of the digital camera 10 turns on, so that the power is supplied to the respective units of the digital camera 10. The digital camera 10 has a plurality of operation modes including at least the capture mode and the playback mode. For example, the main CPU 62 determines which of the operation modes is currently selected by checking the state of the function setting section 116.

In the capture mode, the main CPU 62 monitors the state of the release switch 114. When it is detected that the release switch 114 is half-pressed, the main CPU 62 obtains the luminance data and the distance data from the luminance sensor 54 and the distance sensor 52, respectively. Based on the obtained data, the capture controlling unit 40 works to adjust the focus of the lens section 22, the aperture size of the diaphragm and the like. When the adjustment has been finished, the user is notified that the adjustment is finished, for example, by characters displayed on the LCD monitor 102, such as "stand-by". Then, the main CPU 62 monitors the state of the release switch 114 as to whether or not it is completely pressed. When the release switch 114 is completely pressed, the shutter 26 is closed after a predetermined shutter time period and the stored electric charges of the CCD 30 are then drained out to the capture-signal processor 32. The digital image data generated by the processing by the capture-signal processor 32 is output to the main bus 82. The output digital image data is stored temporarily in the main memory 68 and thereafter is subjected to the necessary processing in the YC processor 70 and the compress/expand processor 78. Then, the processed image data is sent to be recorded in the optional device 76 via the recording medium controller 74. The recorded image is displayed by the LCD monitor 102 at a predetermined period while being frozen, thereby the user can confirm the shot image. As described above, a sequence of the capturing operation is then finished.

On the other hand, in the playback mode, the main CPU 62 reads the last shot image from the main memory 68 via the memory-controlling unit 64. The LCD monitor 102 displays the read image. In this state, when the user instructs the digital camera 10 via the function setting section 116 to perform "NEXT" or "BACK" operation, the next image or the image just before the currently played image is read out to be displayed by the LCD monitor 102.

Figure 3:
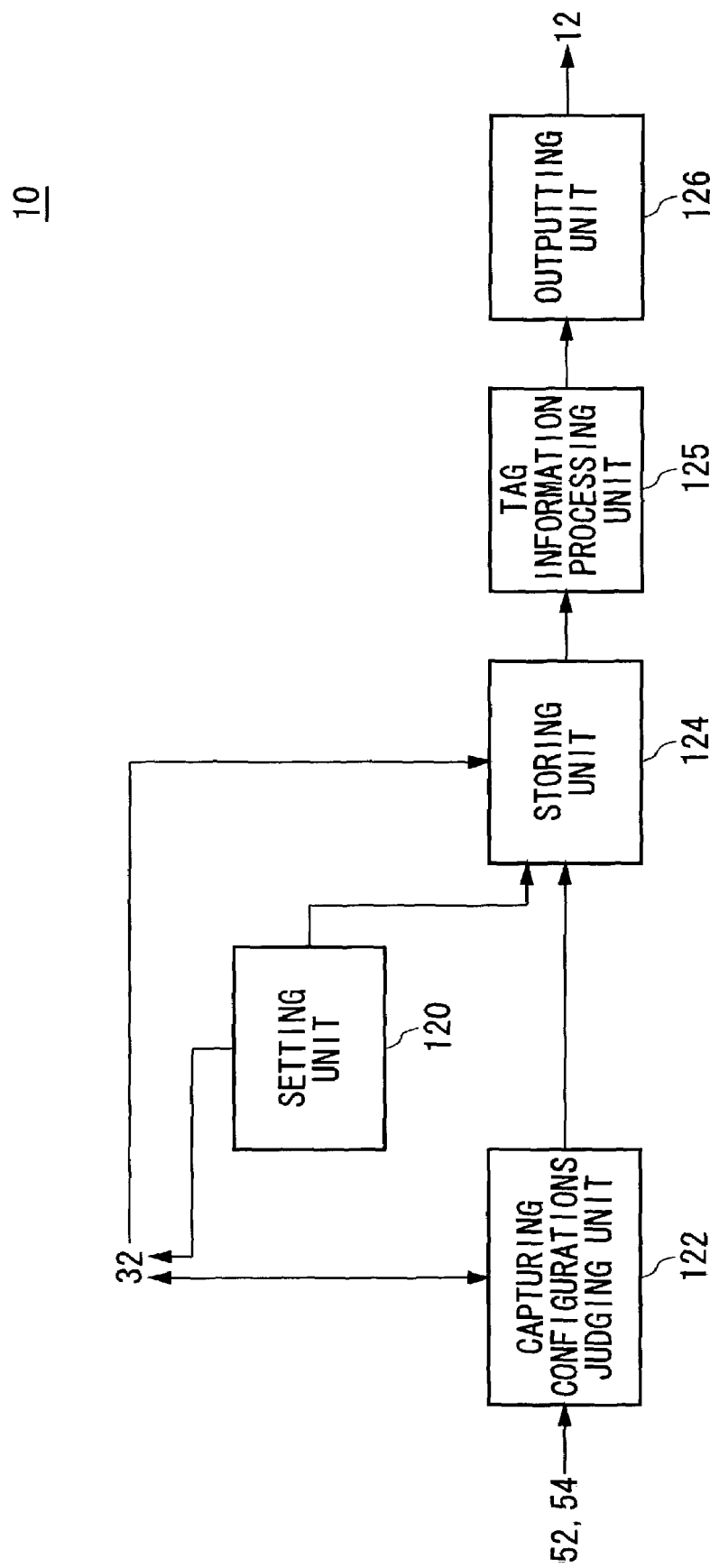
FIG. 3 is a functional block diagram of the digital camera 10, which is characteristic to an embodiment of the invention.

FIG. 3 shows a functional block diagram characteristic to the digital camera 10 of the present embodiment. The digital camera 10 includes a setting unit 120, a capturing configurations judging unit 122, a storing unit 124, a tag information processing unit 125, and an outputting unit 126. The functions of digital camera 10 shown in FIG. 3 can be achieved by cooperation of the main CPU 62 or the capturing system CPU 50 with at least one program stored in or loaded into the non-volatile memory 66 or the main memory 68. In a case where the main CPU 62 has an internal memory, the required program may be stored as firmware in the internal memory and the above-described functions may be realized by the firmware.

For example, the main CPU 62 or the capturing system CPU 50 may have functions of the setting unit 120 capturing configurations judging unit 122 and the tag information processing unit 125. Also, the non-volatile memory 66 and/or the main memory 68 may have functions of storing unit 124. Moreover, the communication I/F 80, the encoder 72, and the optional device controller 74 may have the functions of the color depth adjusting unit 208. Therefore, the design for realizing the aforementioned functions of the digital camera 10 shown in FIG. 3 has a considerable freedom.

Hereinafter, a characteristic manner of the digital camera 10 of the present embodiments will be described with reference to FIG. 3. The setting unit 120 sets obtaining conditions under which an image is obtained, based on a manual operation by the user with the 110 and the like. For example, the setting unit 120 sets manual capturing configurations as an obtaining condition, under which an image of an object is captured based on manual operation by the user. More specifically the setting unit 120 sets exposure, focus, capture mode when an image is captured, and color balance of the image to be processed. The setting unit 120 also sets whether or not the capturing should be subject to an aperture-priority auto exposure, under which the aperture is given priority over the shutter speed. Then, the image capturing unit 20 adjusts each unit based on the manual capturing configurations, which the setting unit 120 set, and captures an image of the subject.

The capturing configurations judging unit 122 determines auto capturing configurations as the obtaining condition under which an image is obtained. For example, when it is noticed by the main CPU 62 that the release switch 114 is half-pressed, the capturing configurations judging unit 122 obtains the luminance data from the luminance sensor 54, the distance data from the distance sensor 52, and/or the image data from the image capturing unit 20. Then, the main CPU 62 determines exposure, focus, capture mode under that an image is captured, and color balance of the image to be processed, based on the data obtained. The image capturing unit 20 adjusts each unit according to the auto capturing configurations, which are determined by the capturing configurations judging unit 122 and captures an image of the subject. In this case, the image capturing unit 20 adjusts each unit giving preference to the manual capturing configurations over the auto capturing configurations.

If the setting unit 120 sets the capturing configurations, the storing unit 124 stores those capturing configurations. More specifically, the storing unit 124 stores exposure information, color balance information, and focus information, which represent respectively the exposure, color balance, and focus set by the setting unit 120. The storing unit 124 may store the capture mode information, which specify the capture mode that the setting unit 120 set. The storing unit 124 may store aperture-priority auto exposure information, which shows that the setting unit 120 selected aperture-priority auto exposure. Moreover, the storing unit 124 may store exposure information, color balance information, focus information, capture mode information, and/or aperture-priority auto exposure information in association with the image data that the image capturing unit 20 output.

Besides, the storing unit 124 may additionally store auto capturing configuration, which the capturing configurations judging unit 122 determined. For example, the storing unit 124 stores the focus that the setting unit 120 set as above, and the focus that the capturing configurations judging unit 122 determined as auto capturing configuration. The storing unit 124 may store the color balance that the setting unit 120 set as above, and the color balance that the capturing configurations judging unit 122 determined as auto capturing configuration. The storing unit 124 may store the aperture value that the setting unit 120 set as above, and the aperture value that the capturing configurations judging unit 122 determined as auto capturing configuration.

The tag information processing unit 125 creates image processing control information, which changes parameters of image processing performed by the printer 12 or the personal computer 14 for the image data, based on the difference between the manual capturing configuration and the auto capturing configuration. In this case the outputting unit 126 outputs the image processing control information, which the tag information processing unit 125 created, in association with the image data.

In a case where the difference between the manual capturing configuration and the auto capturing configuration is bigger than the predetermined value, the tag information processing unit 125 may create a limit command, as the image processing control information, to limit degree of the image processing performed by the printer 12 or the personal computer 14 for the image data. In this case the tag information processing unit 125 may reduce data size of the manual capturing configurations and the auto capturing configurations by compressing or deleting data regarding the image processing that is limited by the limit command. Then the outputting unit 126 outputs the configurations that are reduced in size.

More specifically, if the difference between the manual focus among the manual capturing configurations and the auto focus among the auto capturing configurations is bigger than the predetermined value, the tag information processing unit 125 may create the limit command, as the image processing control information, to suspend or limit the edge enhancing by the printer 12 or the personal computer 14 for the image data. Similarly, if the difference between the manual exposure among the manual capturing configurations and the auto exposure among the auto capturing configurations is bigger than the predetermined value, the tag information processing unit 125 may create the limit command, as the image processing control information, to suspend or limit the color and/or brightness enhancing by the printer 12 or the personal computer 14 for the image data. Moreover, if the difference between the manual color balance among the manual capturing configurations and the auto color balance among the auto capturing configurations is bigger than the predetermined value, the tag information processing unit 125 may create the limit command, as the image processing control information, to suspend or limit the color balance adjustment by the printer 12 or the personal computer 14 for the image data.

Then, the tag information processing unit 125 may delete data regarding auto focus configuration and manual focus configuration among the auto capturing configurations and the manual capturing configurations respectively if the tag information processing unit 125 creates the limit command to suspend or limit the edge enhancing by the printer 12. The tag information processing unit 125 may delete data regarding auto exposure configuration and manual exposure configuration among the auto capturing configurations and the manual capturing configurations respectively, if the tag information processing unit 125 creates the limit command to suspend or limit the color and/or brightness enhancing by the printer 12. The tag information processing unit 125 may delete data regarding auto color balance configuration and manual color balance configuration among the auto capturing configurations and the manual capturing configurations respectively, if the tag information processing unit 125 creates the limit command to suspend or limit the color balance adjustment by the printer 12. Thus, the tag information processing unit 125 reduces the size of the information which is attached to the image data.

The outputting unit 126 outputs the obtaining configurations, which the storing unit 124 stores, in association with the image data of the image obtained. More specifically, the outputting unit 126 outputs the manual exposure information, the manual color balance information, and manual focus information, as the manual capturing configurations of the obtaining configurations, in association with the image data. The outputting unit 126 may output the capture mode information, which the storing unit 124 stores, in association with the image data. The outputting unit 126 may output the aperture-priority auto exposure information, which the storing unit 124 stores, in association with the image data.

Moreover, the outputting unit 126 may additionally output the auto capturing configurations, which the storing unit 124 stores, in association with the image data. For example, the outputting unit 126 may output the manual focus configuration and the auto focus configuration in association with the image data. The outputting unit 126 may output the manual color balance configuration and the auto color balance configuration in association with the image data. The outputting unit 126 may output the manual aperture value and auto aperture value in association with the image data.

Also, the capturing configuration in the present embodiment may include information about the adjustment for the image data. More specifically, the capturing configuration may include the extent of adjustment for the color depth, the color balance, the edge enhancing, and the like, for the image data.

The tag information processing unit 125 may adjust the amount of information that the outputting unit 126 outputs in association with the image data, based on the difference between the manual capturing configuration and the auto capturing configuration. More specifically, the tag information processing unit 125 may reduce the amount of information regarding the auto capturing configuration among the information that the outputting unit 126 outputs in association with the image data, in a case where the difference between the manual capturing configuration and the auto capturing configuration is less than the predetermined value.

For example, if the difference between the manual focus value and the auto focus value is smaller than the predetermined criterion, the tag information processing unit 125 may delete or abridge the auto focus information among the auto capturing configurations, which the outputting unit 126 outputs in association with the image data. Similarly, if the difference between the manual and the auto exposure is less than the predetermined criterion, the tag information processing unit 125 may delete or abridge the auto exposure information among the auto capturing configurations, which the outputting unit 126 outputs in association with the image data. Moreover, if the difference between the manual and the auto color balance is less than the predetermined criterion, the tag information processing unit 125 may delete or abridge the auto color balance information among the auto capturing configurations, which the outputting unit 126 outputs in association with the image data. In this way, the tag information processing unit 125 reduces the amount of information that is attached to the image data.

Figure 4:
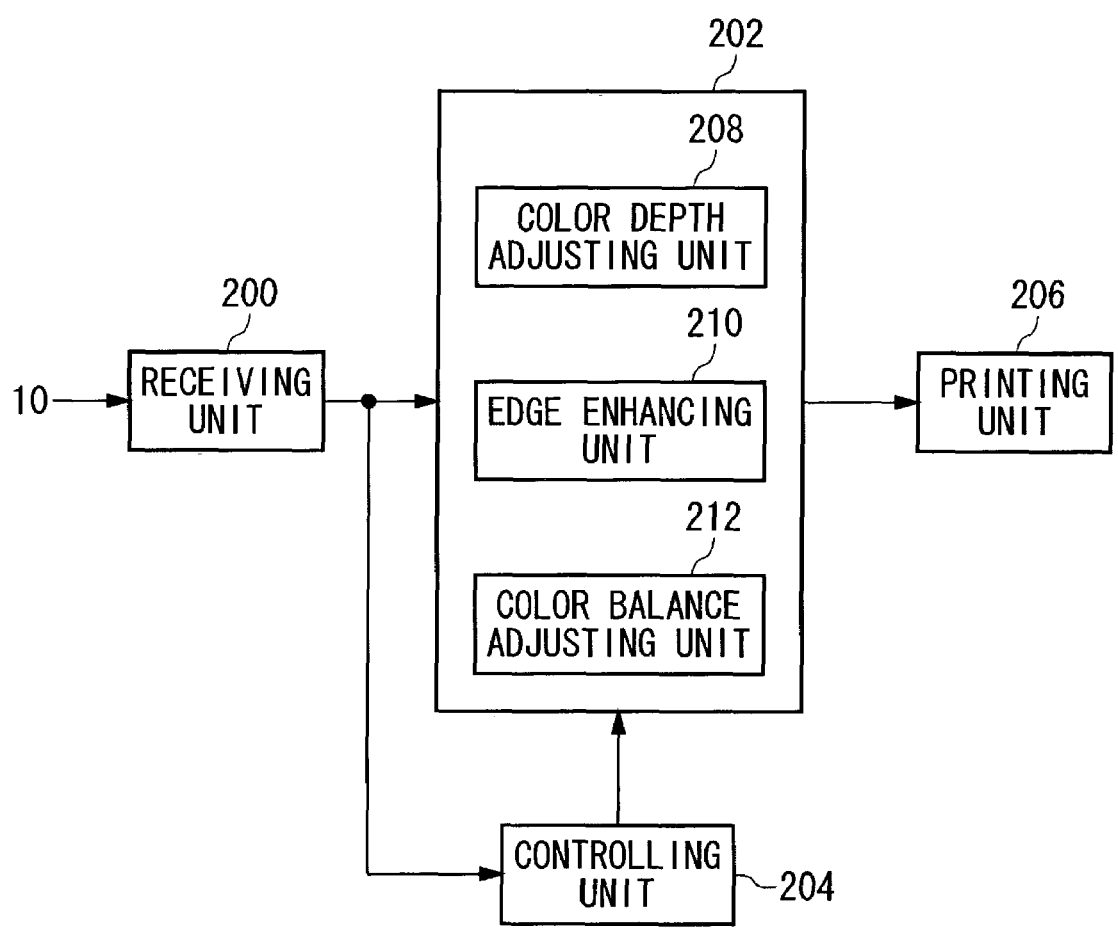
FIG. 4 is a functional block diagram of the printer 12, which is characteristic to an embodiment of the invention.

FIG. 4 is a block diagram of the printer 12 of the present embodiment. The printer 12 comprises a receiving unit 200, an image processing unit 202 which is connected to the receiving unit 200, a controlling unit 204 which is connected to the receiving unit 200 and the image processing unit 202, and a printing unit 206 which is connected to the image processing unit 202. The image processing unit 202 includes a color depth adjusting unit 208, an edge enhancing unit 210, and a color balance adjusting unit 212.

The receiving unit 200 receives the image data and the capturing configurations, which is set by user's manual operations of the digital camera 10 to obtain the image data. For example, the receiving unit 200 receives the manual capturing configurations as the capturing configurations to obtain the image. Specifically, the receiving unit 200 receives the manual exposure information, the manual color balance information, and the manual focus information as part of the manual capturing configurations, which respectively represents the manual exposure, the manual color balance, and the manual focus, to obtain the image of the subject. Also, the receiving unit 200 may receive capture mode information, which specifies the capture mode that is set by user's manual operation of the digital camera 10.

Moreover, the receiving unit 200 additionally receives the auto capturing configurations, which the capturing configurations judging unit 122 of the digital camera 10 determined. More specifically, the receiving unit 200 may receive the manual focus, which is set on the manual operation of the digital camera 10 by the user, as the focus information among the manual capturing configurations and the auto focus, which the capturing configurations judging unit 122 of the digital camera 10 determined, as the focus information among the auto capturing configurations. Similarly, the receiving unit 200 may receive the manual depth of field, which is set on the manual operation of the digital camera 10 by the user, as the exposure information among the manual capturing configurations and the auto depth of field, which the capturing configurations judging unit 122 of the digital camera 10 determined, as the exposure information among the auto capturing configurations. The receiving unit 200 may receive the manual aperture, which is set on the manual operation of the digital camera 10 by the user, as the exposure information among the manual capturing configurations and the auto aperture, which the capturing configurations judging unit 122 of the digital camera 10 determined, as the exposure information among the auto capturing configurations. Moreover, the receiving unit 200 may receive the aperture-priority auto exposure information, which shows that the digital camera 10 is set to the aperture-priority auto exposure mode, as the exposure information among the manual capturing configurations. Besides, the receiving unit 200 may receive capture mode information, which specify the capture mode that is determined by the capturing configurations judging unit 122 of the digital camera 10.

The image processing unit 202 performs several types of image processing for the image data that the receiving unit 200 received. Specifically, the color depth adjusting unit 208 adjusts color depth of the image. The edge enhancing unit 210 enhances edges of the image. The color balance adjusting unit 212 adjusts color balance of the image.

The controlling unit 204 controls the image processing unit 202 based on the capturing configurations that the edge enhancing unit 210 received so as to change degrees of the image processing by the image processing unit 202. Specifically, the controlling unit 204 changes the degree of the image processing by the image processing unit 202 based on the manual capturing configurations. For example, the controlling unit 204 changes the degree of the color depth-adjusting by the color depth adjusting unit 208 based on the exposure information among the manual capturing configurations that the receiving unit 200 received. Also, the controlling unit 204 changes the degree of the color balance-adjusting by the color balance adjusting unit 212 based on the color balance information among the manual capturing configurations that the receiving unit 200 received. Besides, the controlling unit 204 changes the degree of the edge enhancing process by the edge enhancing unit 210 based on the focus information among the manual capturing configurations that the receiving unit 200 received. Moreover, the controlling unit 204 may change the degree of the image processing by the image processing unit 202 based on the capture mode information among the manual capturing configurations.

Also, the storing unit 124 of the digital camera 10 may store image processing-prohibition information, which prohibits the image processing by the printer 12 in association with the image data. In this case, the outputting unit 126 jointly outputs the image data and the image processing-prohibition information. Then, the receiving unit 200 of the printer 12 jointly receives the image data and the image processing-prohibition information from the digital camera 10. Next, the controlling unit 204 cancels the image processing for the image data by the image processing unit 202 on receiving the image processing-prohibition information. The controlling unit 204 may cancel at least one type of the image processing out of the color depth-adjusting by the color depth adjusting unit 208, the edge enhancing by the edge enhancing unit 210, and the color balance-adjusting by the color balance adjusting unit 212, based on the image processing-prohibition information. Then, the printing unit 206 prints the image that is output from the image capturing unit 202.

The above functions by the controlling unit 204 can prevent the image data from being subject to the color depth-adjusting, the color balance-adjusting, and/or the edge enhancing against the user's intent in the case that the user intentionally changed the configurations of the exposure, the color balance, and/or the capture mode to obtain the image of the subject.

Also, the controlling unit 204 may change the contents of the image processing by the image processing unit 202 based on the manual and auto capturing configurations. Specifically, the controlling unit 204 may decrease the degree of the edge enhancing process by the edge enhancing unit 210 corresponding to the increase of the difference between the manual focus and the auto focus that the receiving unit 200 received. Similarly, the controlling unit 204 may decrease the degree of the edge enhancing process by the edge enhancing unit 210 corresponding to the increase of the difference between the manual depth of field and the auto depth of field that the receiving unit 200 received. And the controlling unit 204 may decrease the degree of the edge enhancing process by the edge enhancing unit 210 corresponding to the increase of the difference between the manual aperture and the auto aperture that the receiving unit 200 received. Moreover, if the receiving unit 200 has received the aperture-priority auto exposure information, the controlling unit 204 may decrease the degree of the edge enhancing process by the edge enhancing unit 210 corresponding to the increase of the difference between the manual aperture and the auto aperture that the receiving unit 200 received. The controlling unit 204 may cancel at least one type of the image processing performed by the image processing unit 202 based on the capturing configuration.

The above functions of the controlling unit 204 help to prevent unintended processing of the edge enhancing for the image when the user changed the focus or the aperture value intentionally to obtain the image.

Moreover the controlling unit 204 may change the contents of the image processing by the image processing unit 202 based on the difference between the manual capturing configurations and auto capturing configurations. If the difference between the manual capturing configurations and the auto capturing configurations is less than the predetermined value, the controlling unit 204 may analyze the image that the receiving unit 200 received and change the contents of the image processing by the image processing unit 202 based on the results of the analysis. Specifically, if the difference between the manual focus and the auto focus is less than the predetermined value, if the difference between the manual depth of field and the auto depth of field is less than the predetermined value, or if the difference between the manual aperture and the auto aperture is less than the predetermined value, the controlling unit 204 may analyze the image that the receiving unit 200 received and change the contents of the image processing by the color depth adjusting unit 208, the edge enhancing unit 210, and the color balance adjusting unit 212, based on the results of the analysis.

Also, in a case where the difference between the manual capturing configurations and the auto capturing configurations is more than predetermined value, the controlling unit 204 may set the contents of the image processing by the image processing unit 202 to those perset in the printer 12. Specifically, in a case where the difference between the manual focus and the auto focus is more than the predetermined value, if the difference between the manual depth of field and auto depth of field is more than the predetermined value, or if the difference between the manual aperture and the auto aperture is more than the predetermined value, the controlling unit 204 may set the image processing by the color depth adjusting unit 208, the edge enhancing unit 210, and/or the color balance adjusting unit 212, to those preset in the printer 12.

In other words, if the difference between the manual capturing configurations and the auto capturing configurations is less than the predetermined value, it is judged that the capturing configurations are manually optimized on the digital camera 10 according to the user's intent. In this case, the image processing unit 202 performs image processing based on the results of the analysis by the controlling unit 204. Meanwhile, if the difference between the manual capturing configurations and the auto capturing configurations is more than the predetermined value, it is judged that the capturing configurations are changed from the normal value on the digital camera 10 according to the user's intent. In this case, the image processing unit 202 performs predetermined image processing.

The above operations of the controlling unit 204 can prevent unintended image processing of the color depth-adjusting and/or the edge enhancing when the user intentionally changed focus, depth of field, and/or aperture to obtain image.

The printing unit 206 prints the image that is processed by the image capturing unit 202.

Moreover, according to another example of the digital camera 10 and the printer 12, the setting unit 120 may set image processing control information, which indirectly designates parameters of the image processing that the printer 12 performs for the image data. In this case, the outputting unit 126 outputs the image processing control information in association with the image data. The receiving unit 200 in the printer 12 receives the image data and the image processing control information. Then, the controlling unit 204 changes the parameter of the image processing that the image processing unit 202 performs for the image data based on the image processing control information.

More specifically, the printer 12 stores a process degree-designating table associating in advance a process degree-designating code, which is a kind of image processing control information, with a degree of various image processing. Then, the setting unit 120 in the digital camera 10 selects the process degree-designating code for each image data corresponding to the user's operation. The user may select the process degree-designating code checking the image data, which is obtained by the digital camera 10 and the like or may select the process degree-designating code in advance according to the type of subject to be captured. Then, the outputting unit 126 outputs the image data and the process degree-designating code, which is selected as described above, in association with each other.

The receiving unit 200 in the printer 12 receives the image data and the process degree-designating code, which is set on the digital camera 10 based on the user's operation. Then the controlling unit 204 refers to the process degree-designating table and obtains the parameters of the various image processing which corresponds to the process degree-designating code. Next, the controlling unit 204 changes parameters of the image processing unit 202 to match with the parameters obtained. Then the image processing unit 202 performs the image processing for the image data with the parameters changed by the image capturing unit 204.

Figure 5:
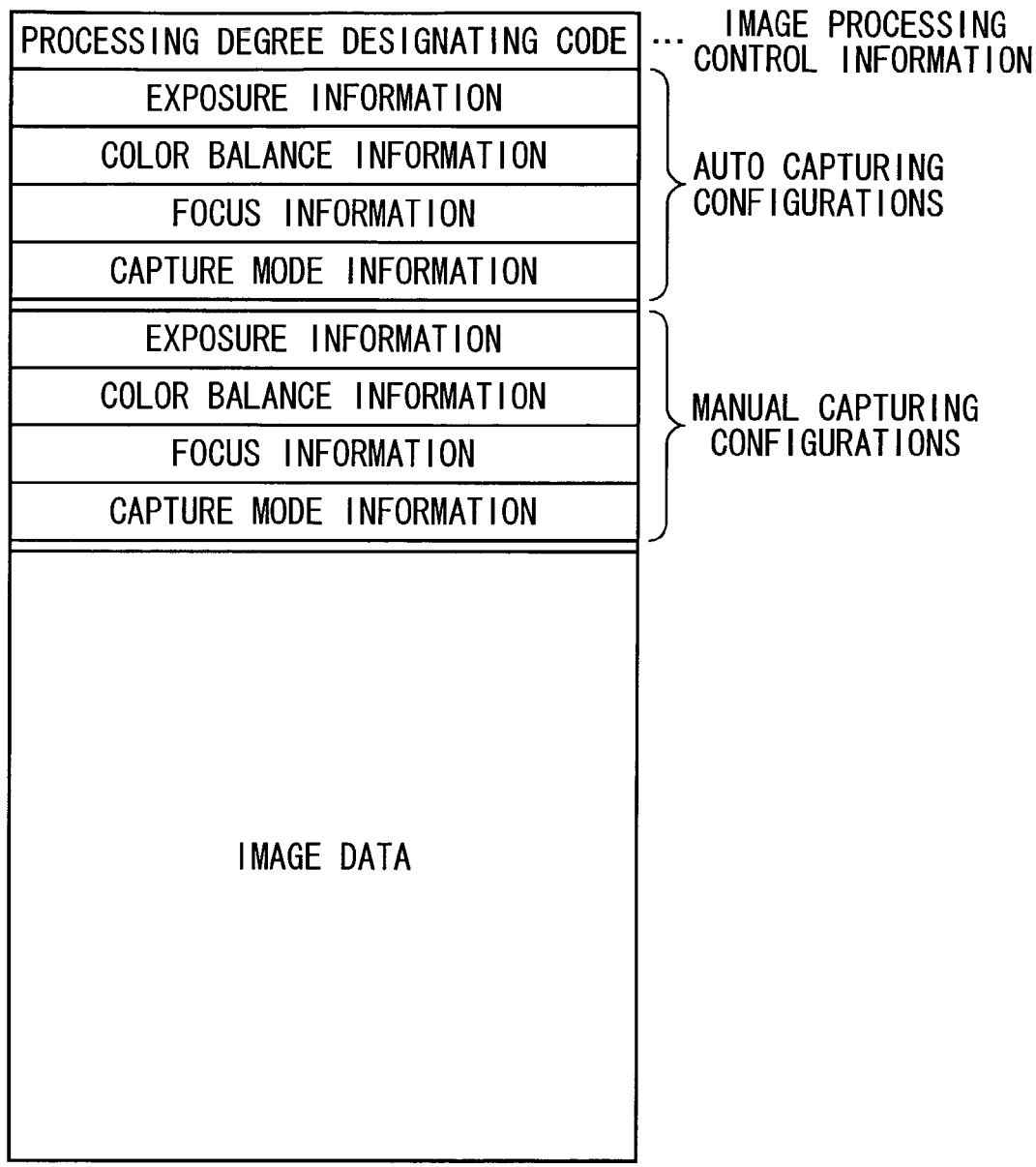
FIG. 5 is an example of a data format that the printer 12 outputs.

FIG. 5 shows an example of the data that the outputting unit 126 of the digital camera 10 outputs. The data that the outputting unit 126 outputs comprises the image data and the tag information, which includes the auto capturing configurations, manual capturing configurations, and the image processing control information. The auto capturing configurations have exposure information that represents exposure value determined by the capturing configurations judging unit 122, color balance information that represents color balance determined by the capturing configurations judging unit 122, focus information that represents focus determined by the capturing configurations judging unit 122, and capture mode information that represents capture mode determined by the capturing configurations judging unit 122. The manual capturing configurations have exposure information that represents the exposure value set by the setting unit 120, the color balance information that represents color balance set by the setting unit 120, the focus information that represents focus set by the setting unit 120, and the capture mode information that represents capture mode set by the setting unit 120. The image processing control information has process degree-designating codes, which designate contents or degree of the image processing that the user intends. In this case, the process degree-designating code may be single or a combination of alphanumeric characters, or user information that identifies user who operated the digital camera 10 when the image data is obtained. The image data is data such as that in JPEG format.

Figure 6:
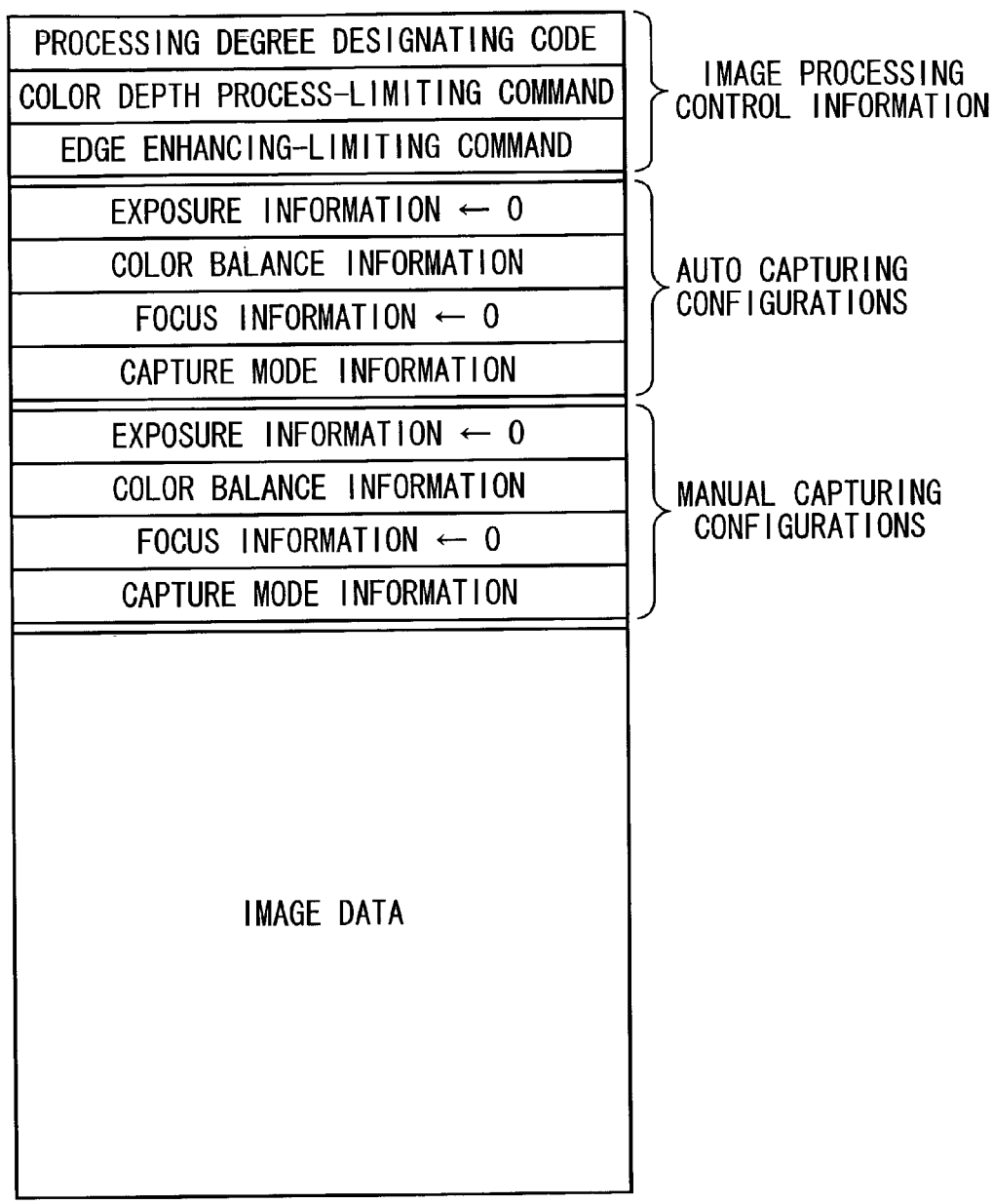
FIG. 6 is another example of a data format that the printer 12 outputs.

FIG. 6 shows another example of the data that the outputting unit 126 outputs. In addition to the process degree-designating code, which is described in FIG. 5, the image processing control information has a color depth process-limiting command, which limits degree of the color depth-adjusting in the printer 12 or the personal computer 14, and an edge enhancing-limiting command, which limits degree of the edge enhancing in the printer 12 or the personal computer 14. In this case, the color depth process-limiting command may be a color depth process-prohibiting command, which prohibits the color depth-adjusting in the printer 12 or the personal computer 14. The edge enhancing-limiting command may be an edge enhancing-prohibiting command, which prohibits the edge enhancing in the printer 12 or the personal computer 14. Besides, among the information included in the auto capturing configurations, the exposure information, which relates to the color depth-adjusting, and the focus information, which relates to the edge enhancing process, are compressed or erased. Similarly, among the information included in the manual capturing configurations, the exposure information, which relates to the color depth-adjusting, and the focus information, which relates to the edge enhancing process, are compressed or erased.

Figure 7:
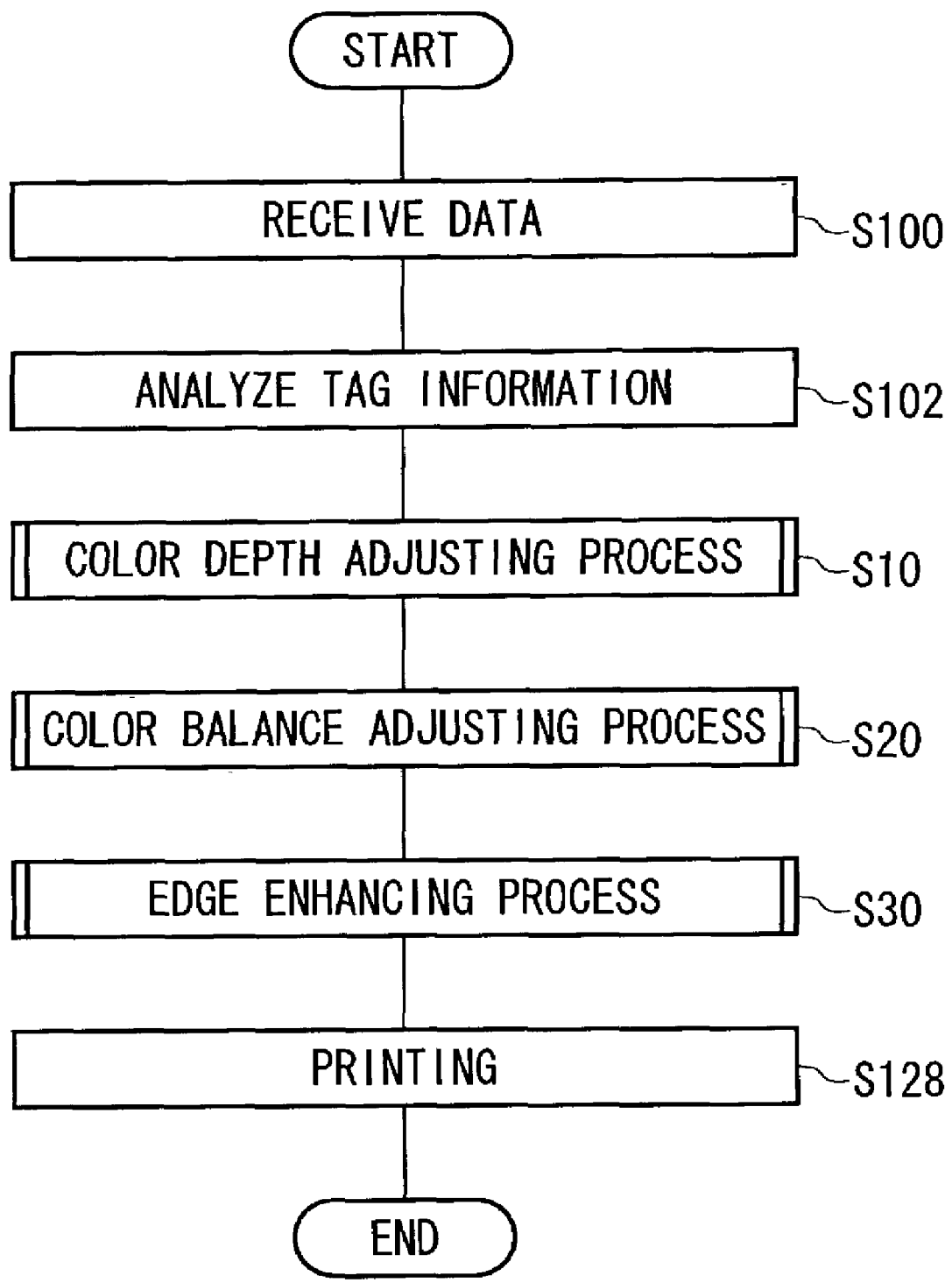
FIG. 7 is a flowchart of an image processing operation by the printer 12 according to an embodiment of the invention.

FIG. 7 is a flow chart of an image processing operation by the printer 12 according to the present embodiment. The receiving unit 200 receives image data and tag information, which includes auto capturing configurations, manual capturing configurations, and the image processing control information (S100). The controlling unit 204 analyzes the tag information and reads auto capturing configurations, manual capturing configurations, and image processing control information (S102). Then, the image processing unit 202 carries out a color depth-adjusting process (S10), a color balance-adjusting process (S20), and an edge enhancing process (S30), being controlled by the controlling unit 204. Finally, the printing unit 206 prints the image that is processed by the image capturing unit 202.

Figure 8:
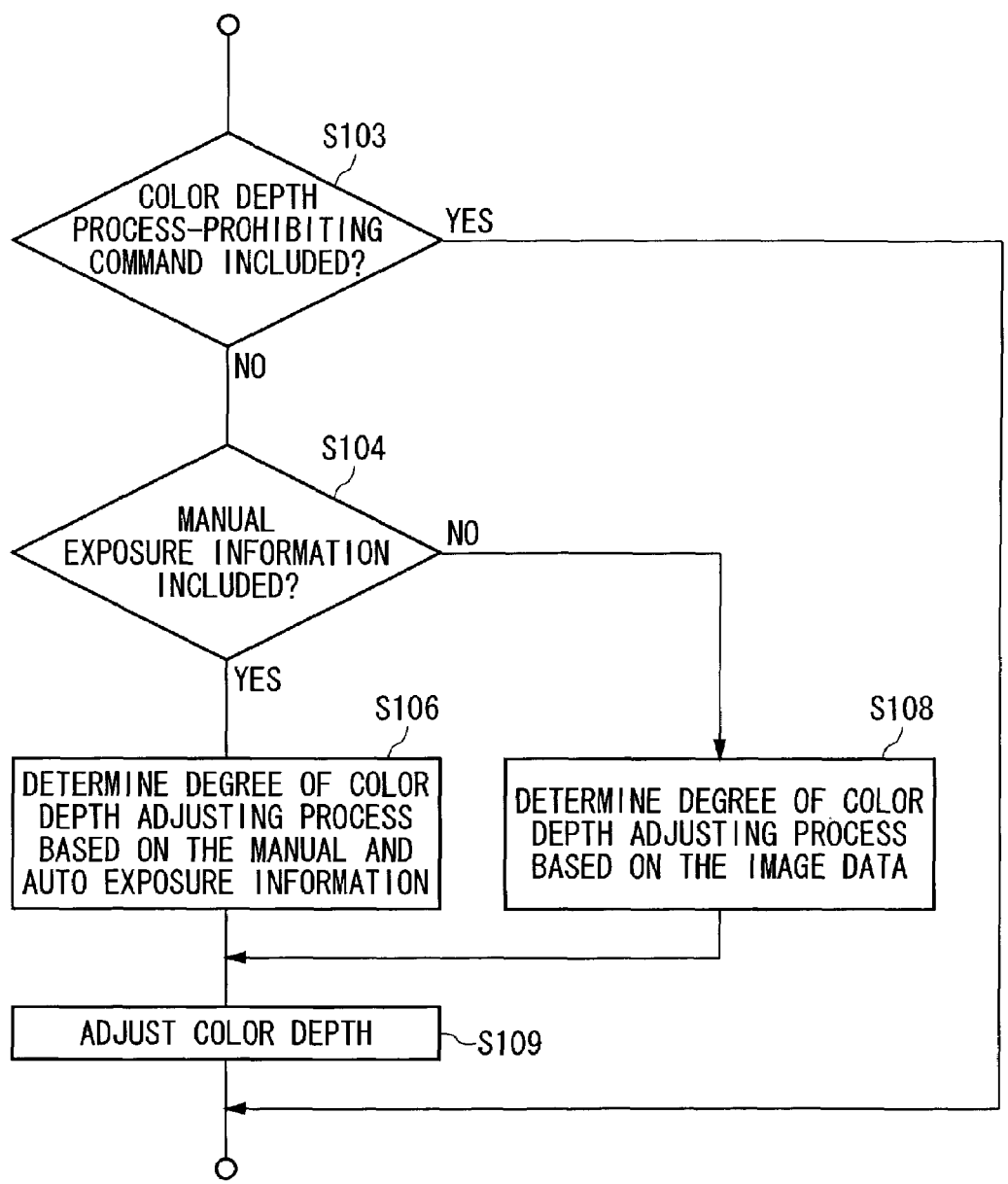
FIG. 8 is a detailed procedure of the color depth adjusting process in FIG. 7.

FIG. 8 is a detailed procedure of S10 described in FIG. 7. The controlling unit 204 determines whether or not the color depth process-prohibiting command, as the image processing control information, is included in the tag information (S103). In a case where the color depth process-prohibiting command is determined to be included in the tag information, S10 ends. On the other hand, in a case where the color depth process-prohibiting command is determined not to be included in the tag information, the controlling unit 204 determines whether or not the exposure information, among the manual capturing configurations, is included in the tag information (S104). In a case where the exposure information, among the manual capturing configurations, is determined to be included in the tag information, the controlling unit 204 determines degree of color depth-adjusting process by the color depth adjusting unit 208 based on the exposure information of the manual capturing configurations and that of the auto capturing configurations (S106). In a case where the exposure information, among the manual capturing configurations, is determined not to be included in the tag information, the controlling unit 204 determines degree of color depth-adjusting process by the color depth adjusting unit 208 based on the image data (S108). Then, the color depth adjusting unit 208 adjusts color depth of the image data with the degree determined in S106 or S108 (S109).

Figure 9:
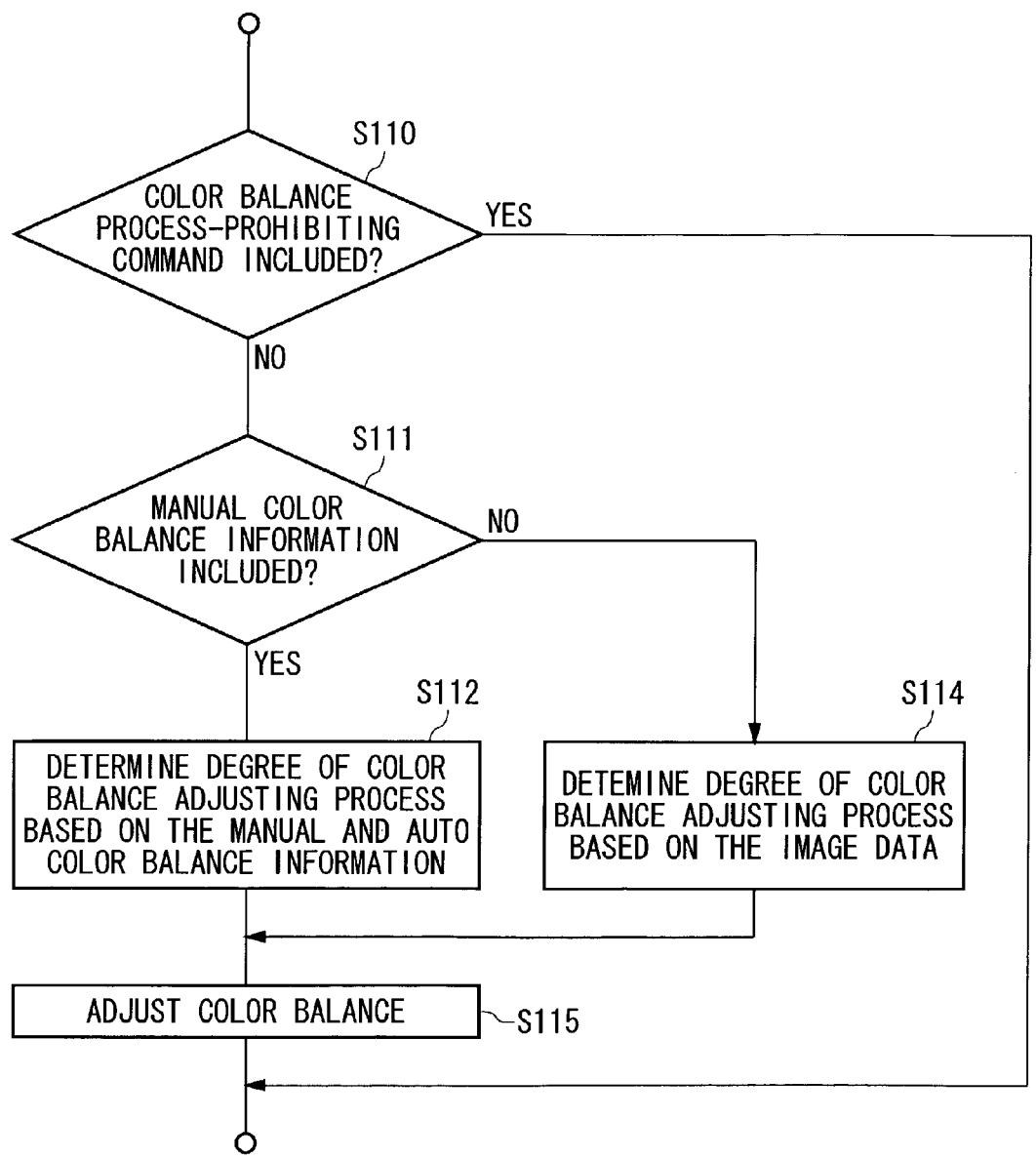
FIG. 9 is a detailed procedure of the color balance adjusting process in FIG. 7.

FIG. 9 is a detailed procedure of S20 described in FIG. 7. The controlling unit 204 determines whether or not the color balance process-prohibiting command, as the image processing control information, is included in the tag information (S110). In a case where the color balance process-prohibiting command is determined to be included in the tag information, S20 ends. On the other hand, in a case where the color balance process-prohibiting command is determined not to be included in the tag information, the controlling unit 204 determines whether or not the color balance information, among the manual capturing configurations, is included in the tag information (S111). In a case where the color balance information, among the manual capturing configurations, is determined to be included in the tag information, the controlling unit 204 determines degree of color balance-adjusting process by the color balance adjusting unit 212 based on the color balance information of the manual capturing configurations and that of the auto capturing configurations (S112). In a case where the color balance information, among the manual capturing configurations, is determined not to be included in the tag information, the controlling unit 204 determines degree of color balance-adjusting process by the color balance adjusting unit 212 based on the image data (S114). Then, the color balance adjusting unit 212 adjusts color balance of the image data with the degree determined in S112 or S114 (S115).

Figure 10:
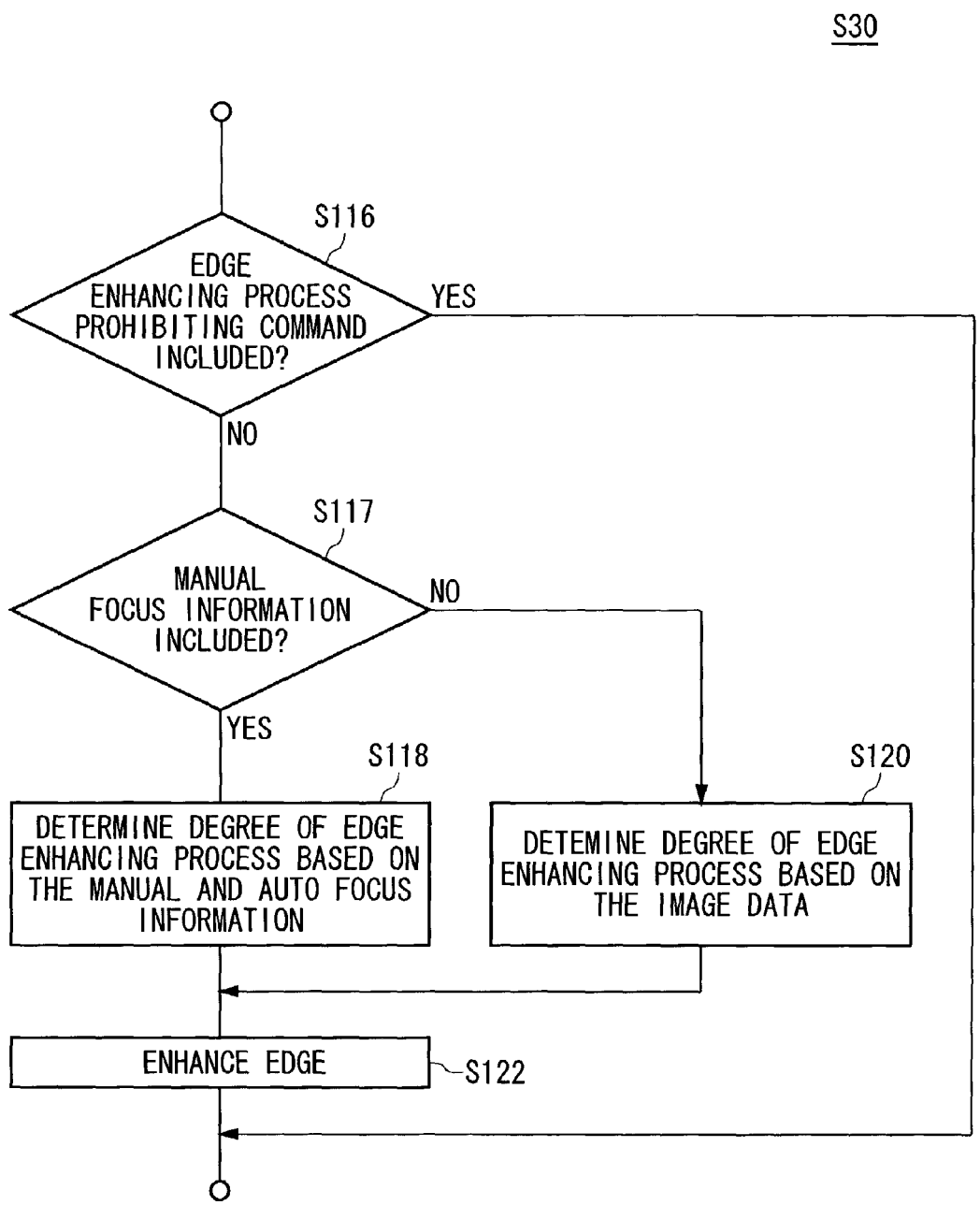
FIG. 10 is a detailed procedure of the edge enhancing process in FIG. 7.

FIG. 10 is a detailed procedure of S30 described in FIG. 7. The controlling unit 204 determines whether or not the edge enhancing process-prohibiting command, as the image processing control information, is included in the tag information (S116) In a case where the edge enhancing process-prohibiting command is determined to be included in the tag information, S30 ends. On the other hand, in a case where the edge enhancing process-prohibiting command is determined not to be included in the tag information, the controlling unit 204 determines whether or not the focus information, among the manual capturing configurations, is included in the tag information (S117). In a case where the focus information, among the manual capturing configurations, is determined to be included in the tag information, the controlling unit 204 determines degree of edge enhancing process by the edge enhancing unit 210 based on the edge enhancing information of the manual capturing configurations and that of the auto capturing configurations (S118). In a case where the edge enhancing information, among the manual capturing configurations, is determined not to be included in the tag information, the controlling unit 204 determines degree of edge enhancing adjusting process by the edge enhancing unit 210 based on the image data (S120). Then, the edge enhancing unit 210 enhances edges of the image data with the degree determined in S118 or S120 (S122).

Figure 11:
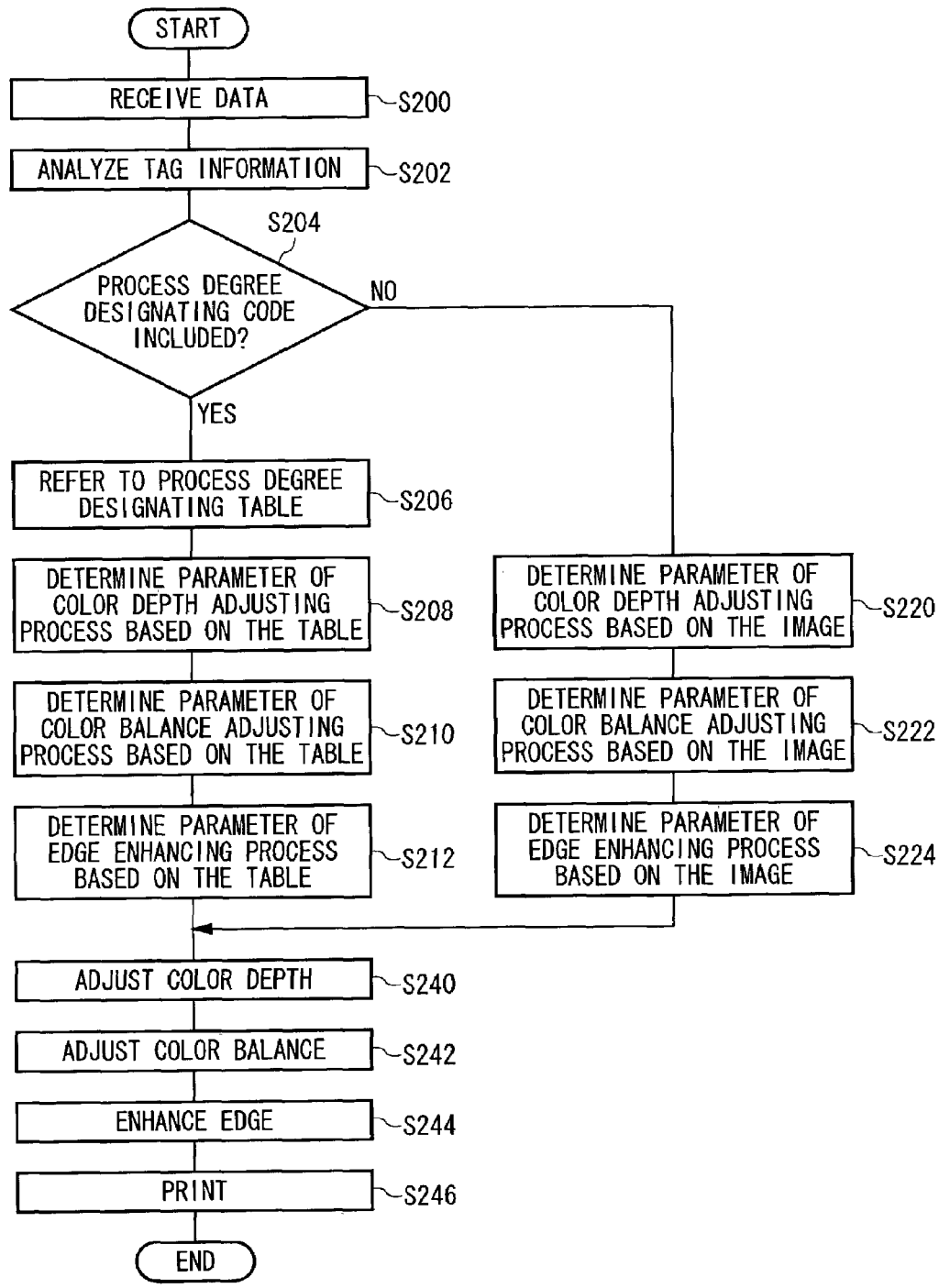
FIG. 11 is a flowchart of another image processing operation of the printer 12 according to an embodiment of the invention.

FIG. 11 is a flowchart of another image processing operation by the printer 12 according to the present embodiment. The receiving unit 200 receives image data and tag information, which includes image processing control information (S200). The controlling unit 204 analyzes the tag information, which the receiving unit 200 received (S202).

Next, the controlling unit 204 determines whether or not a process degree-designating code, as image processing control information, is included in the tag information, which the receiving unit 200 received (S204) In a case where the process degree-designating code is determined to be included, the controlling unit 204 refers to the process degree-designating table (S206), and determines parameters of the color depth-adjusting process based on the table (S208), and determines parameters of the color balance-adjusting process based on the table (S210), and determines parameters of the edge enhancing process based on the table (S212).

In S204, in a case where the process degree-designating code is determined not to be included, the controlling unit 204 determines appropriate parameters of the color depth-adjusting process based on the image (S220), and determines appropriate parameters of the color balance-adjusting process based on the image (S222) and determines appropriate parameters of the edge enhancing process based on the image (S224).

Then the color depth adjusting unit 208 adjusts color depth of the image with the parameters determined in S208 or S220 (S240). The color balance adjusting unit 212 adjusts color balance of the image with the parameters determined in S210 or S222 (S242) The edge enhancing unit 210 enhances edges of the image with the parameters determined in S212 or S224 (S244) Finally, the printing unit 206 prints the image that is image-processed by the image processing unit 202 (S246).

FIG. 12 shows an example of the process degree-designating table, which the controlling unit 204 of the printer 12 refers to. The table associates the process degree-designating code, which is set in the digital camera 10 on the user's operation, with the parameters that designate degree of various image processing. The table may contain, as initial settings on shipment of the printer 12, a plurality of image processing patterns. The image processing patterns may include beforehand, for example, a pattern that is suitable for a portrait shot, or a pattern that is suitable for a landscape shot. Moreover, the table may be customized to the user's taste. This customization may be carried out by user's operation of the personal computer 14 when the printer 12 and the personal computer 14 are connected. It is also conceivable that the user may check the image that is printed by the printer 12 and operate a setting unit of the printer 12 to customize the table. Moreover, the process degree-designating code may be user information, which identifies the user of the printer 12 and/or the personal computer 14. In this case, the process degree-designating table may contain a plurality of the image processing patterns which reflect the user's tastes.

Figure 13:
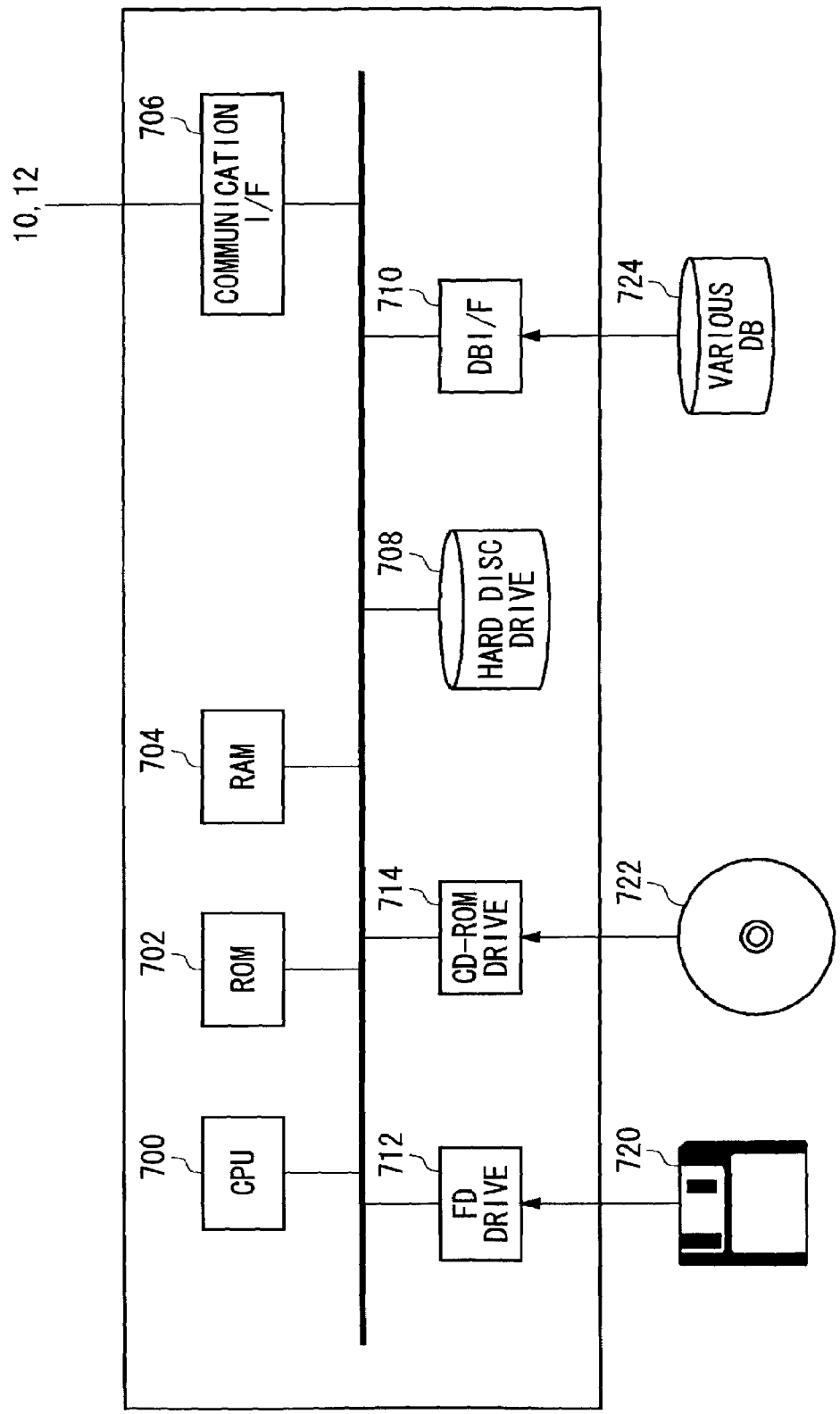
FIG. 13 shows a hardware configuration of the personal computer 14 according to an embodiment of the invention.

FIG. 13 shows the hardware configuration of the personal computer 14 of the present embodiment. The personal computer 14 comprises a CPU 700, a ROM 702, a RAM 704, a communication interface 706, a hard disk drive 708, a data base interface 710, a floppy disk drive 712, and a CD-ROM drive 714. The CPU 700 operates based on at least one program stored in the ROM 702 or RAM 704 and controls each unit. The communication interface 706 communicates with the digital camera 10 and the printer 12. The database interface 710 writes and updates data in a database.

The floppy disk drive 712 reads data or a program from the floppy disk 720 and provides it to the communication interface 706. The CD-ROM drive 714 reads data or a program from the CD-ROM 722 and provides it to the communication interface 706. The communication interface 706 transmits the data or the program that is provided by the floppy disk drive 712 or the CD-ROM drive 714 to the digital camera 10 or the printer 12. The database interface 710 transmits and receives data with the various databases.

The program for the printer 12 is provided to the user while being stored in a recording medium, for example, the CD-ROM 722. The program is read from the recording medium and installed to the digital camera 10 or the printer 12 through the communication interface 706 and executed in the digital camera 10 or the printer 12.

The functional configuration of the program that is provided while being stored in a recording medium and installed to the digital camera 10 comprises a setting module, a capturing configurations judging module, a storing module, a tag information processing module, and an outputting module. The operations that the above modules let the digital camera 10 carry out are the same as those of the units that correspond to the modules.

The functional configuration of the program that is provided while being stored in a recording medium and installed to the printer 12 comprises a receiving module, a controlling module, an image processing module, a color depth-adjusting module, an edge enhancing module, a color balance-adjusting module, and a printing module. The operations that the above modules let the printer 12 carry out are the same as those of the units that correspond to the modules.

The floppy disk 720 or the CD-ROM 722 as examples of the recording medium can store a part or all of the functions and operations of the digital camera 10 or the printer 12 of the present embodiment.

The program for the above procedure may be executed while being read from the recording medium directly into the digital camera 10 or the printer 12. Alternatively, the program for the above procedures may be executed after being installed into the digital camera 10 or the printer 12.

It may be determined based on the free area of the memory or the processing power of the digital camera 10 and printer 12 whether each module described above is installed into the digital camera 10 or the printer 12. For example, in a case where the free area of the memory or the processing power of the digital camera 10 is a predetermined value more than those of the printer 12, the image processing module, the color depth-adjusting module, the edge enhancing module, and color balance-adjusting module may be installed into the digital camera 10 in addition to the modules described above. In this case, the image processing module, the color depth-adjusting module, the edge enhancing module, and color balance-adjusting module are not necessarily installed into the printer 12.

As a recording medium, other than the floppy disk and the CD-ROM, an optical recording medium such as a DVD or a PD, a magneto-optical recording medium such as an MD, a tape-like medium, a magnetic recording medium, or a semiconductor memory such as an IC card or a miniature card can be used. The recording medium may store the above program provided by a host computer via a communication network. The program stored in the recording medium may be stored in a hard disk of the host computer, sent to the computer as the digital camera 10 or the printer 12 of the present embodiment from the host computer via the communication network.

The recording medium storing the aforementioned program is used only for manufacturing the digital camera 10 or the printer 12 of the present application and it is therefore apparent that manufacturing or selling such a recording medium as business can constitute infringement of the right based on the present application.

Thus, the digital camera 10 in the present embodiment can change the contents of the image processing in the printer 12 by way of outputting image capturing configurations, which are set in accordance with the user's manual operations, as tag information in association with the image data. Moreover, the printer 12 in the present embodiment can analyze the tag information received from the digital camera 10 and change the contents of the image processing based on the capturing configurations, which are set in accordance with the user's manual operations.

Therefore, the digital camera 10 and the printer 12 in the present embodiment can be controlled to prevent unwished image processing in the printer 12 for the image that are obtained with the capturing configurations set in accordance with the user's manual operations of the digital camera 10 so that the printer 12 can print the image to the user's taste.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image capturing apparatus for capturing an image of a subject, comprising:
    a setting unit, which sets an obtaining condition for the image in accordance with user's operation;
    an outputting unit, which outputs the obtaining condition in association with the image;
    a capturing configurations judging unit, which is connected to said outputting unit and determines auto capturing configuration as the capturing configuration for the image; and
    a tag information processing unit, which is connected to said setting unit and said capturing configuration judging unit, and generates image processing control information for changing a parameter of an image processing to be performed subsequent to capturing the image, based on the difference between the manual capturing configuration and the auto capturing configuration, wherein said setting unit sets a manual capturing configuration as the obtaining condition for the image, and said outputting unit outputs the manual capturing configuration, the auto capturing configuration and the image processing control information in association with the image.

2. An image capturing apparatus as claimed in claim 1, wherein
said setting unit sets exposure as the manual capturing configuration for the image, and
said outputting unit outputs exposure information, which represents the exposure, in association with the image.

3. An image capturing apparatus as claimed in claim 1, wherein
said setting unit sets color balance of the image as the manual capturing configuration, and
said outputting unit outputs color balance information, which represents the color balance, in association with the image.

4. An image capturing apparatus as claimed in claim 1, wherein
said setting unit sets focus for the image as the manual capturing configuration, and
said outputting unit outputs focus information, which represents the focus, in association with the image.

5. An image capturing apparatus as claimed in claim 1, wherein
said setting unit sets capture mode for the image as the manual capturing configuration, and
said outputting unit outputs capture mode information, which represents the capture mode, in association with the image.

6. An image capturing apparatus as claimed in claim 1, wherein
said setting unit sets aperture-priority auto exposure, in which exposure is determined giving priority to aperture, as the manual capturing configuration, and
said outputting unit outputs aperture-priority auto exposure information, which shows that the aperture-priority auto exposure is set, in association with the image.

7. An image capturing apparatus as claimed in claim 1, wherein
said outputting unit outputs:
manual focus value, which represents focus set by said setting unit as the manual capturing configuration, and auto focus value, which represents focus determined by said capturing configurations judging unit as the auto capturing configuration, in association with the image.

8. An image capturing apparatus as claimed in claim 1, wherein
said outputting unit outputs:
manual color balance value, which represents color balance set by said setting unit as the manual capturing configuration, and
auto color balance value, which represents color balance determined by said capturing configurations judging unit as the auto capturing configuration, in association with the image.

9. An image capturing apparatus as claimed in claim 1, wherein
said outputting unit outputs:
manual aperture value, which represents aperture value set by said setting unit as the manual capturing configuration, and auto aperture value, which represents aperture value determined by said capturing configurations judging unit as the auto capturing configuration, in association with the image.

10. An image capturing apparatus for capturing an image of a subject, comprising:
a setting unit, which sets an obtaining condition for the image in accordance with user's operation:
an outputting unit, which outputs the obtaining condition in association with the image;
a capturing configurations judging unit, which is connected to said outputting unit and determines auto capturing configuration as the capturing configuration for the image; and
a tag information processing unit, which is connected to said setting unit and said capturing configuration judging unit, and generates image processing control information for changing a parameter of an image processing to be performed subsequent to capturing the image, based on the difference between the manual capturing configuration and the auto capturing configuration,
wherein said setting unit sets a manual capturing configuration as the obtaining condition for the image, and said outputting unit outputs the manual capturing configuration, the auto capturing configuration and the image processing control information in association with the image, and
wherein said tag information processing unit generates information for limiting degree of the image processing, as the image processing control information, in a case the difference between the manual capturing configuration and the auto capturing configuration is bigger than a predetermined value, and reduces an amount of information regarding the image processing to be limited.

11. An image capturing apparatus for capturing an image of a subject, comprising:
a setting unit, which sets an obtaining condition for the image in accordance with user's operation;
an outputting unit, which outputs the obtaining condition in association with the image;
a capturing configurations judging unit, which is connected to said outputting unit and determines auto capturing configuration as the capturing configuration for the image; and
a tag information processing unit, which is connected to said setting unit, said capturing configurations judging unit, and said outputting unit, and adjusts an amount of the information that said outputting unit outputs in association with the image, based on the difference between the manual capturing configuration and the auto capturing configuration, said information being used in an image processing subsequent to capturing the image,
wherein said setting unit sets a manual capturing configuration as the obtaining condition for the image, and said outputting unit outputs the manual capturing configuration and the auto capturing configuration in association with the image.

12. An image capturing apparatus for capturing an image of a subject, comprising;
a setting unit, which sets an obtaining condition for the image in accordance with user's operation;
an outputting unit, which outputs the obtaining condition in association with the image;

a capturing configurations judging unit, which is connected to said outputting unit and determines auto capturing configuration as the capturing configuration for the image; and a tag information processing unit, which is connected to said setting unit and said capturing configuration judging unit, and generates image processing control information for changing a parameter of an image processing to be performed subsequent to capturing the image, based on the difference between the manual capturing configuration and the auto capturing configuration, wherein said setting unit sets a manual capturing configuration as the obtaining condition for the image, and said outputting unit outputs the manual capturing configuration and the auto capturing configuration in association with the image, and wherein said tag information processing unit reduces the amount of the information regarding the auto capturing configuration among the information that said outputting unit outputs in association with the image, in a case where the difference between the manual capturing configuration and the auto capturing configuration is less than a predetermined value.

13. An image capturing apparatus for capturing an image of a subject, comprising:

a setting unit, which sets an obtaining condition for the image in accordance with user's operation;

an outputting unit, which outputs the obtaining condition in association with the image;

a capturing configurations judging unit, which is connected to said outputting unit and determines auto capturing configuration as the capturing configuration for the image; and a tag information processing unit, which is connected to said setting unit and said capturing configuration judging unit, and generates image processing control information for changing a parameter of an image processing to be performed by an apparatus connecting with the image capturing apparatus, based on the difference between the manual capturing configuration and the auto capturing configuration, wherein said setting unit sets a manual capturing configuration as the obtaining condition for the image, and said outputting unit outputs the manual capturing configuration, the auto capturing configuration and the image processing control information in association with the image.

14. An image capturing apparatus for capturing as claimed in claim 13, wherein said apparatus connecting with the image capturing apparatus comprises a printer and/or a personal computer.

15. An image capturing apparatus for capturing an image of a subject, comprising:

a setting unit, which sets an obtaining condition for the image in accordance with user's operation;

an outputting unit, which outputs the obtaining condition in association with the image;

a capturing configurations judging unit, which is connected to said outputting unit and determines auto capturing configuration as the capturing configuration for the image; and a tag information processing unit, which is connected to said setting unit, said capturing configurations judging unit, and said outputting unit, and adjusts an amount of the information that said outputting unit outputs in association with the image, based on the difference between the manual capturing configuration and the auto capturing configuration, said information being used in an image processing to be performed by an apparatus connecting with the image capturing apparatus, wherein said setting unit sets a manual capturing configuration as the obtaining condition for the image, and said outputting unit outputs the manual capturing configuration, the auto capturing configuration and the image processing control information in association with the image.

16. The image capturing apparatus as claimed in claim 15, wherein said apparatus connecting with the image capturing apparatus comprises a printer and/or a personal computer.

* * * * *